United States Patent
Suga

(10) Patent No.: US 8,090,310 B2
(45) Date of Patent: Jan. 3, 2012

(54) RADIO BASE STATION, RELAY STATION, AND RELAY METHOD

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 11/907,297

(22) Filed: Oct. 10, 2007

(65) Prior Publication Data

US 2008/0108304 A1    May 8, 2008

(30) Foreign Application Priority Data

Nov. 7, 2006   (JP) .................................. 2006-301213

(51) Int. Cl.
*H04B 7/14* (2006.01)
*H04B 3/36* (2006.01)

(52) U.S. Cl. .................... 455/7; 455/9; 455/447; 455/24

(58) Field of Classification Search ............. 455/9, 11.1, 455/7, 18, 24, 422.1, 447, 446, 67.11, 67.13, 455/68, 15, 452.1; 370/315, 389, 349
See application file for complete search history.

(56) References Cited

U.S. PATENT DOCUMENTS

| | | | | |
|---|---|---|---|---|
| 6,690,657 | B1 * | 2/2004 | Lau et al. ....................... | 370/315 |
| 7,746,842 | B2 * | 6/2010 | Sugaya ........................... | 370/349 |
| 2005/0048914 | A1 | 3/2005 | Sartori et al. | |
| 2005/0272366 | A1 * | 12/2005 | Eichinger et al. ................. | 455/9 |
| 2006/0233200 | A1 | 10/2006 | Fifield et al. | |
| 2007/0190933 | A1 | 8/2007 | Zheng et al. | |
| 2008/0317017 | A1 * | 12/2008 | Wiemann et al. ............. | 370/389 |
| 2009/0017814 | A1 * | 1/2009 | Horiuchi et al. ........... | 455/422.1 |

FOREIGN PATENT DOCUMENTS

| | | |
|---|---|---|
| EP | 1 843 488 | 10/2007 |
| JP | 2009-524323 A | 6/2009 |
| WO | WO-2005/008947 A1 | 1/2005 |
| WO | 2005/025110 | 3/2005 |
| WO | 2006/024320 | 3/2006 |
| WO | 2006/090669 | 8/2006 |
| WO | WO-2007/083219 A2 | 7/2007 |

OTHER PUBLICATIONS

European Search Report with Written Opinion and Abstract attached, for corresponding European Patent Application No. 07117769.5; Dated Jun. 30, 2009.
Korean Intellectual Property Office Office Action for corresponding Korean Patent Application No. 10-2007-0108297, with a mailing date of Jun. 15, 2009, English translation attached.
IEEE Standard for Local and metropolitan area networks; Part 16: Air Interface for Fixed and Mobile Broadband Wireless Access Systems; IEEE Std 802.16e-2005.

(Continued)

*Primary Examiner* — John J Lee
(74) *Attorney, Agent, or Firm* — Fujitsu Patent Center

(57) ABSTRACT

A disclosed relay station is provided between a radio base station and a radio terminal for relaying a radio signal. The relay station includes a receiving unit configured to receive data transmitted from the radio base station or the radio terminal; a storage unit configured to hold the data; and a transmitting unit configured to relay the data to the radio terminal or the radio base station, and resend the data originating from the relay station in the event that the data need to be resent.

19 Claims, 23 Drawing Sheets

OTHER PUBLICATIONS

IEEE Standard for Local and metropolitan area networks; Part 16: Air Interface for Fixed Broadband Wireless Access Systems; IEEE 802.16; Oct. 1, 2004.

Japanese Office Action mailed Aug. 30, 2011 for corresponding Japanese Application No. 2006-301213, with partial English-language translation.

* cited by examiner

FIG.23

| SIGNAL PATTERN | MEANING |
|---|---|
| ACK | SIGNAL INDICATING THAT DATA HAS BEEN PROPERLY RECEIVED BY MS |
| NACK | SIGNAL INDICATING THAT ERROR HAS BEEN DETECTED IN DATA WHEN RECEIVED BY RS |
| RS ACK | SIGNAL INDICATING THAT DATA HAS BEEN PROPERLY RECEIVED BY RS BUT ERROR HAS BEEN DETECTED IN DATA WHEN RECEIVED BY MS |

RADIO BASE STATION, RELAY STATION, AND RELAY METHOD

BACKGROUND OF THE INVENTION

1. Field of the Invention

The present invention relates to a radio base station, a relay station, and a relay method using radio communication. The present invention is especially advantageous when it is applied to a case where a radio communication system prescribed by IEEE 802.16 is used as a base system and thereto a relay station is added.

2. Description of the Related Art

A radio communication system carrying out communication with the use of a radio channel, i.e., WCDMA, CDMA2000 or such, as a typical example, currently spreads worldwide. In such a radio communication system, a plurality of radio base stations are set for a service area, and each radio terminal carries out communication with another communication apparatus (i.e., another communication terminal) with the use of any of the radio base stations. At this time, an overlapping area is provided with an adjacent service area in which an adjacent base station can carry out radio communication, and, handover to the adjacent radio base station is available when a radio environment degrades.

Further, as a radio communication method, for example, code division multiplexing, time division multiplexing, frequency division multiplexing, OFDMA or such, is applicable. In these methods, generally speaking, a plurality of radio terminals can connect to a single radio base station simultaneously.

FIG. 1 illustrates a radio communication system with a single radio base station (BS) and plural radio terminals (MS) belonging under the radio base station. Radio communication is performed based on a so-called P-MP connection, in which plural radio terminals can be connected to a single radio base station.

However, even within the service area in which the radio base station can carry out radio communication, high speed communication may not be available in a place close to the area boundary, since the radio environment may not be satisfactory. Further, even within the area, radio signal propagation may be obstructed by a cause such as building shading. Thus, an area (so-called dead zone) in which satisfactory radio connection with the radio base station is difficult may occur.

In order to solve the problem, a plan in which a relay station is disposed in the service area of the radio bases station, and radio communication is available between the radio terminal and the radio base station with the use of the relay station, has been proposed.

Especially, in a task group of 802.16j, introduction of such a relay station (RS) is currently being studied.

FIG. 2 illustrates a radio communication system including a relay station.

The radio base station transmits a preamble, MAP data, and burst data. A radio terminal (MS #1) directly performs radio communication with the radio base station, and a radio terminal (MS #2) performs radio communication with the radio base station via a relay station (RS).

The above-described items concerning IEEE 802.16 are disclosed in the following non-patent documents 1 and 2.

Non-patent document 1: IEEE Std 802.16TM-2004
Non-patent document 2: IEEE Std 802.16eTM-2005

In general radio communication systems, reception errors may be caused by conditions of transmission channels. In such cases, the transmitting side apparatus resends signals to the receiving side apparatus (e.g., ARQ (Automatic Repeat reQuest), HARQ (Hybrid Automatic Repeat reQuest)), so that the transmission data is transmitted to the receiving side apparatus.

However, if the above-described relay station is installed in the radio communication system, the radio terminal will be able to perform radio communications with the radio base station via the relay station, but the following problem will arise. That is, the radio segment will be divided into plural segments by the relay station (in this case, into two segments), and therefore, additional measures will be necessary for controlling the resending operation in an efficient manner.

SUMMARY OF THE INVENTION

The present invention provides a radio base station, a relay station, and a relay method in which one or more of the above-described disadvantages are eliminated.

A preferred embodiment of the present invention provides a radio base station, a relay station, and a relay method capable of resending data in an efficient manner even when radio communication between a radio terminal and a radio base station is performed via a relay station.

An embodiment of the present invention provides a relay station provided between a radio base station and a radio terminal for relaying a radio signal, the relay station including a receiving unit configured to receive data transmitted from the radio base station or the radio terminal; a storage unit configured to hold the data; and a transmitting unit configured to relay the data to the radio terminal or the radio base station, and resend the data originating from the relay station in the event that the data need to be resent.

An embodiment of the present invention provides a relay station provided between a radio base station and a radio terminal for relaying a radio signal, the relay station including a receiving unit configured to receive data transmitted from the radio base station or the radio terminal; and a reporting unit configured to report, to the radio base station, a reception result of the data.

An embodiment of the present invention provides a radio base station for performing radio communication with a radio terminal via a relay station, the radio base station including a creating unit configured to create transmission control data defining a data transmission region from the relay station the radio terminal and a data transmission region from the relay station to the radio base station in the event that the relay station receives data transmitted from the radio base station or from the radio terminal and the data is to be resent originating from the relay station; and a transmitting unit configured to transmit the transmission control data.

An embodiment of the present invention provides a radio base station for performing radio communication with a radio terminal via a relay station, the radio base station including a control unit configured to receive a reception result of data, reported by the relay station, in the event that the relay station receives the data transmitted from the radio base station or from the radio terminal.

An embodiment of the present invention provides a relay station in a radio communication system provided with a transmitting station, the relay station, and a receiving station, the relay station including a reporting unit configured to determine whether there is an error in data received from the transmitting station and report, to the receiving station, an error determination result.

An embodiment of the present invention provides a receiving station in a radio communication system provided with a transmitting station, a relay station, and the receiving station, the receiving station including a control unit configured to generate a report signal for reporting a resending request to the relay station in the event of receiving, from the relay station, an error determination result indicating that there is no error in data from the transmitting station received by the relay station, and determining that there is an error in the data transferred from the relay station to the receiving station.

An embodiment of the present invention provides a relay station in a radio communication system provided with a transmitting station, the relay station, and a receiving station, the relay station including a reporting unit configured to report, to the transmitting station, a reception result of data received from the transmitting station; and a transmitting unit configured to resend the data to the receiving station in the event of receiving a resending report from the transmitting station.

An embodiment of the present invention provides a transmitting station in a radio communication system including the transmitting station, a relay station, and a receiving station, the transmitting station including a receiving unit configured to receive, from the relay station, a reception result of data transmitted from the transmitting station and received by the relay station, and to receive, from the receiving station, a reception result of the data received by the receiving station; and a control unit configured to determine whether to resend the data from the relay station to the receiving station or to resend the data from the transmitting station via the relay station to the receiving station, according to the contents received by the receiving station.

An embodiment of the present invention provides a relay station in a radio communication system including a transmitting station, the relay station, and a receiving station, the relay station including an error detecting unit configured to detect an error in data received from the transmitting station; a transmitting unit configured to transfer the data to the receiving station in the event that the error detecting unit detects no errors from the data; a receiving unit configured to receive, from the receiving station, a reception result of the data transferred to the receiving station; and a control unit configured to generate a control signal to be sent to the transmitting station according to whether the error detecting unit detects an error and also according to the reception result.

An embodiment of the present invention provides a transmitting station in a radio communication system including the transmitting station, a relay station, and a receiving station, the transmitting station including a receiving unit configured to receive a control signal from the relay station; and a reporting unit configured to report a resending request to the relay station to resend data in the event of determining, based on the control signal, that the data need to be resent originating from the relay station.

An embodiment of the present invention provides a relay method performed by a relay station provided between a radio base station and a radio terminal for relaying a radio signal, the relay method including the steps of receiving data transmitted from the radio base station or the radio terminal; holding the data; relaying the data to the radio terminal or the radio base station; and resending the data originating from the relay station in the event that the data need to be resent.

An embodiment of the present invention provides a relay method performed by a relay station provided between a radio base station and a radio terminal for relaying a radio signal, the relay method including the steps of receiving data transmitted from the radio base station or the radio terminal; and reporting, to the radio base station, a reception result of the data.

According to one embodiment of the present invention, data can be resent in an efficient manner even when radio communication between a radio terminal and a radio base station is performed via a relay station.

BRIEF DESCRIPTION OF THE DRAWINGS

Other objects, features and advantages of the present invention will become more apparent from the following detailed description when read in conjunction with the accompanying drawings, in which:

FIG. 23 indicates signals and their meanings according to the third embodiment of the present invention.

DETAILED DESCRIPTION OF THE PREFERRED EMBODIMENTS

A description is given, with reference to the accompanying drawings, of an embodiment of the present invention.

[a] Description of First Embodiment

Figure 1:
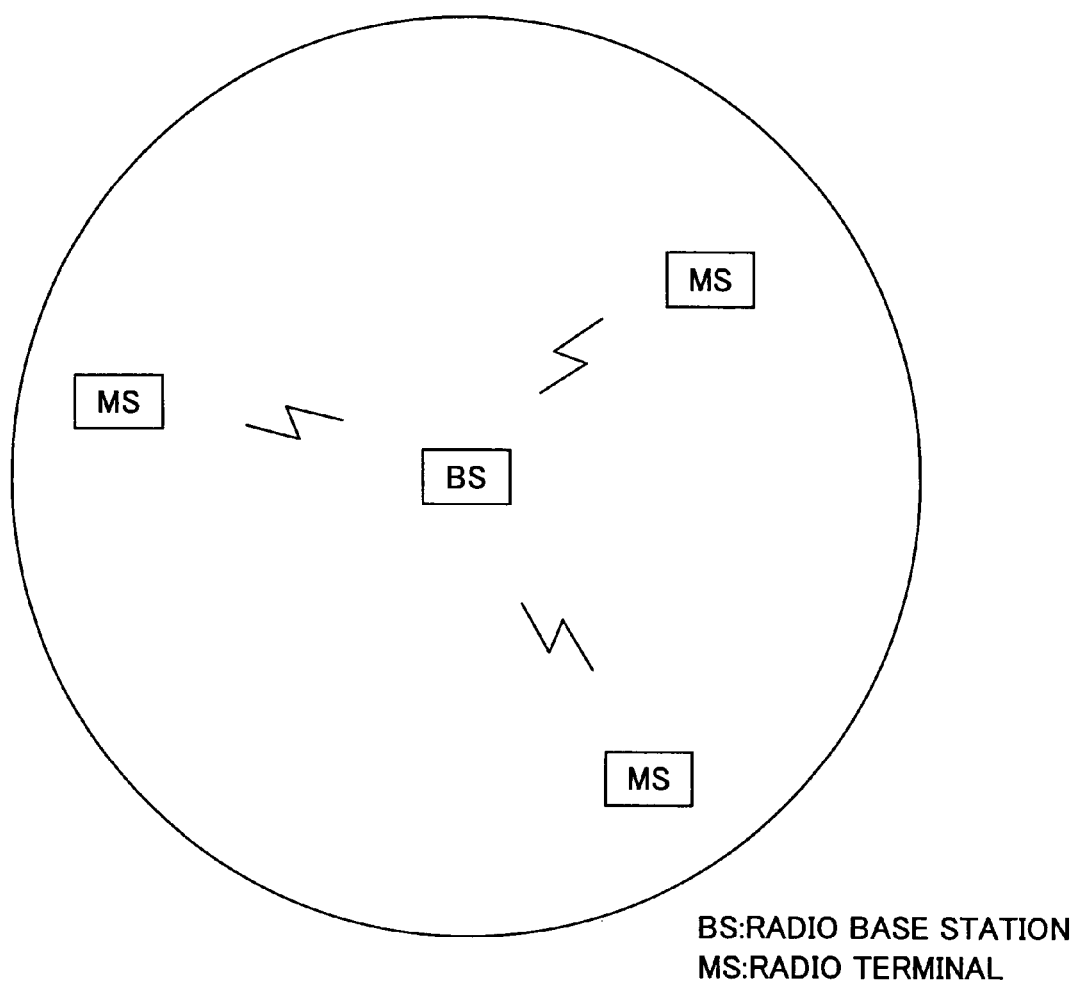
FIG. 1 illustrates a conventional radio communication system.
Figure 2:
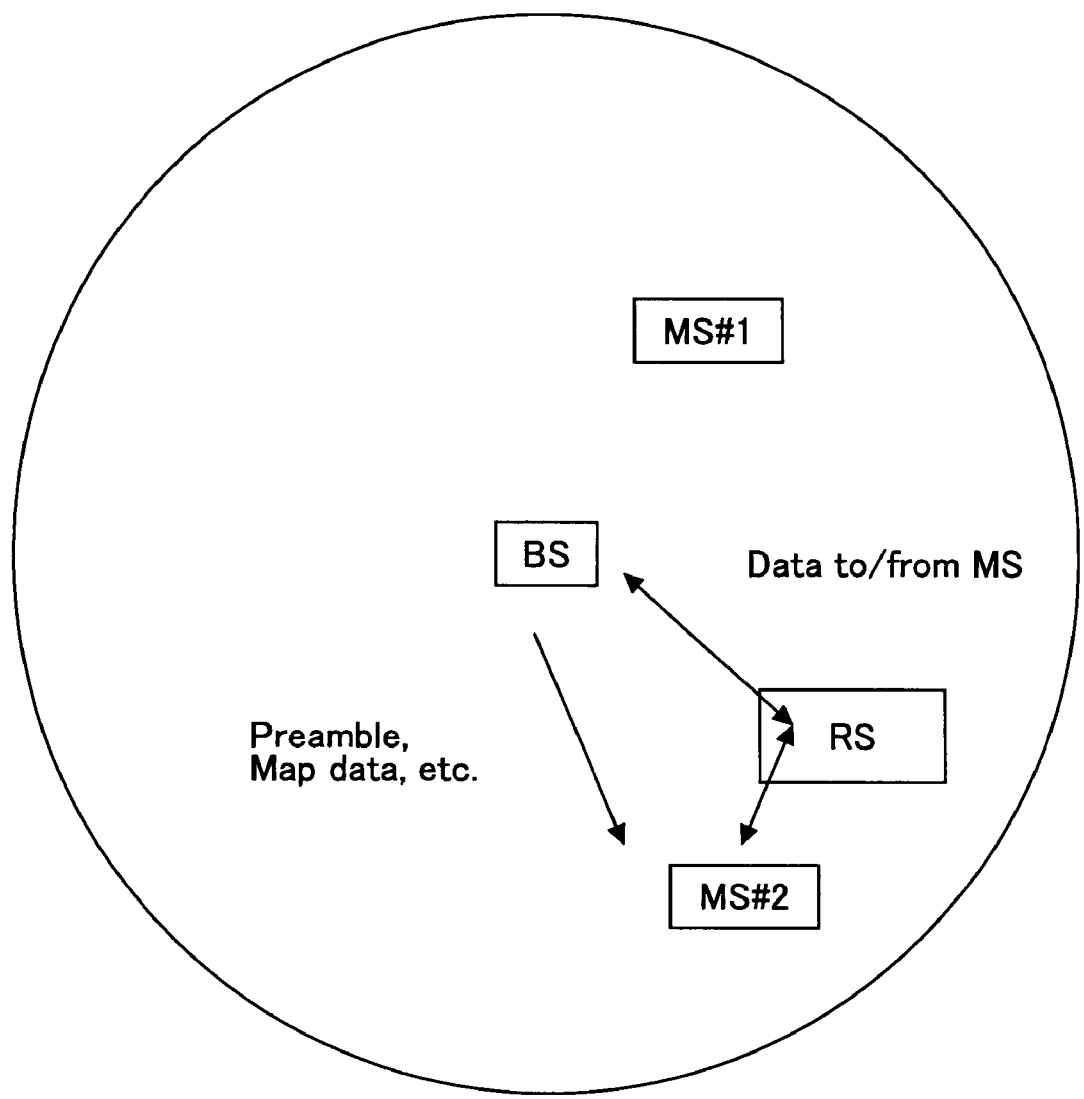
FIG. 2 illustrates a radio communication system including a relay station.
Figure 3:
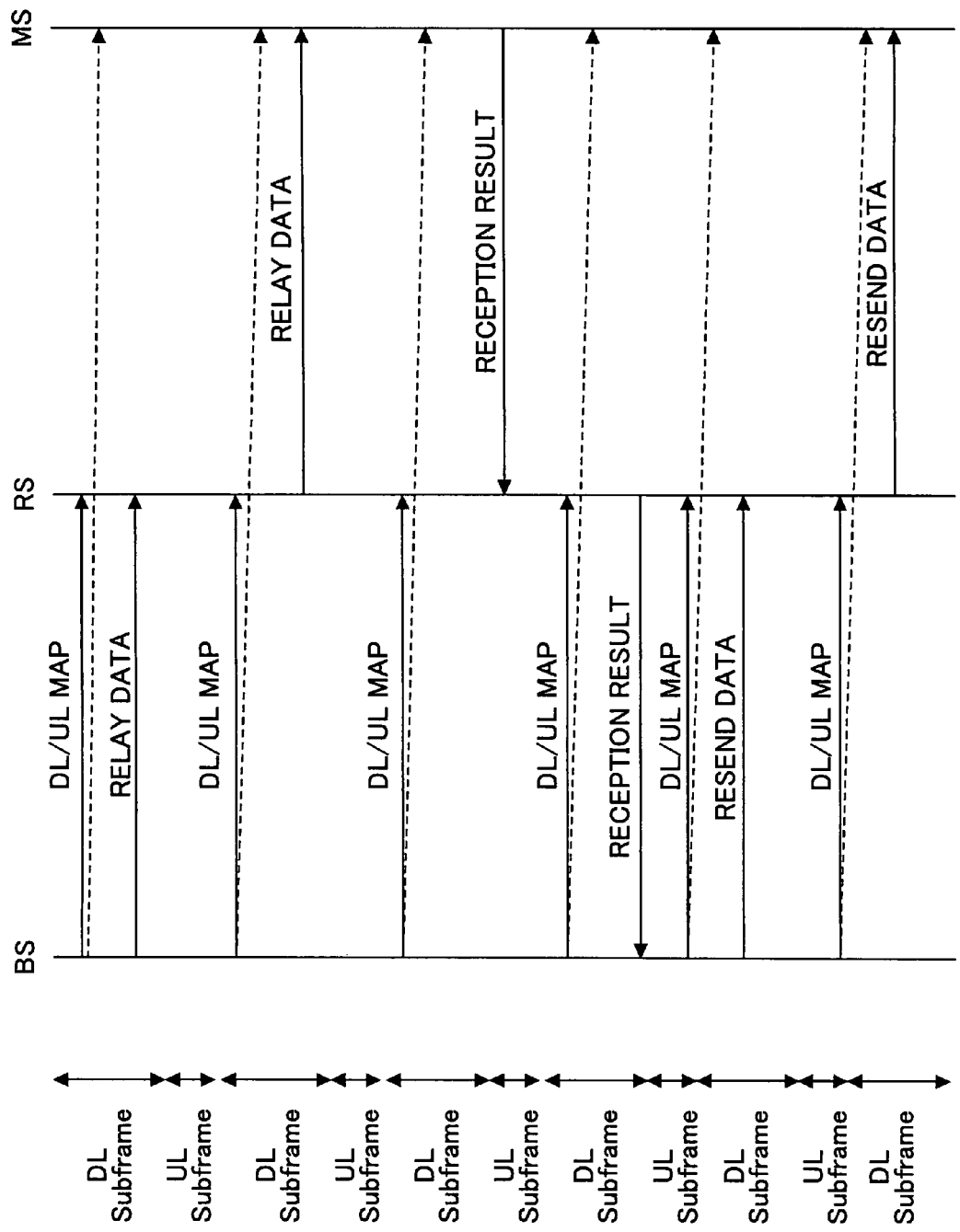
FIG. 3 is a sequence diagram of a process performed by a radio communication system according to a first embodiment of the present invention.

FIG. 3 is a sequence diagram of a process performed by a radio communication system according to a first embodiment of the present invention. In the first embodiment, a relay station is additionally installed in a radio communication system defined by IEEE 802.16 including a radio base station and a radio terminal performing radio communication with each other. As a matter of course, this process sequence is applicable to any other radio communication system provided with a relay apparatus.

In FIG. 3, BS (Base Station) indicates a radio base station, which is one of a plurality of radio base stations arranged in a distributed manner in an area providing a radio communication service based on this radio communication system. There are other BSs forming radio areas adjacent to the radio area formed by this BS, although not illustrated herein.

In this radio communication system, transmission/reception channels (uplink and downlink directions) of BS, MS, and RS are controlled by definition data for transmission/reception channels, which definition data is referred to as MAP data transmitted by the BS.

The MAP data includes transmitting/receiving timings, subchannel information used for transmitting/receiving, a code value representing a modulation method and an error correcting encoding method, and a CID (Connection ID) for identifying a connection. Each of the MS and RS identifies whether a connection is pertinent to itself according to the CID, and performs radio communication (transmission or reception of radio signals) at transmitting/receiving timings and with subchannels corresponding to the CID pertinent to itself. Accordingly, the MAP data can be considered as data defining a transmission/reception region. The CID is preferably also attached to data stored in a transmission region defined by the MAP data.

In the MAP data, data that defines a communication region in the uplink direction (MS to RS (BS) or RS to BS) is referred to as UL (uplink)-MAP data and data that defines a communication region in the downlink direction (BS to RS (MS) or RS to MS) is referred to as DL (downlink)-MAP data.

MS indicates a radio terminal. When the MS is within the radio area formed by the BS, the MS can perform radio communication with the BS. The radio terminal can perform communication at different locations (e.g., while moving). When the radio terminal has moved to an adjacent radio area formed by another radio base station, a hand over process is performed, so that the radio terminal can continue performing radio communication. The MS can directly communicate with the BS; however, in this example, the MS performs radio communication with the BS via the RS.

RS indicates a relay station, which is arranged in such a manner as to perform radio communication with the BS. The RS transmits signals to the MS according to signals received from the BS. Conversely, the RS transmits signals to the BS according to signals received from the MS. In this manner, dead zones can be eliminated.

FIG. 3 is a sequence diagram of a resending control method performed by the radio communication system.

As described above, the BS transmits a preamble and MAP data (including both UL and DL) in the downlink subframe, and also transmits burst data in a region defined by the MAP data in the same subframe. The region is defined by transmitting/receiving timings and a transmission subchannel, etc.

The RS and MS receive the preamble transmitted from the BS, synchronize with the transmission frame of the BS, and receive MAP data that is continuously transmitted.

The MAP data is transmitted from the BS but not from the RS, and therefore, the MS belonging under the RS directly receives MAP data from the BS.

The burst data to the RS (downlink MMR link) is defined in the DL-MAP data (defined in accordance with the connection ID of the RS), and therefore, the RS receives the burst data from the BS. The burst data includes user data to be transmitted to the MS, and is illustrated as relay data in FIG. 3.

In the next downlink subframe, the BS transmits a preamble and MAP data (including both UL and DL) in the downlink subframe, and also transmits burst data in a region defined by the MAP data. However, the DL-MAP data defines a timing (T1) at which the user data is to be transmitted to the MS, and therefore, the BS does not transmit data in this transmission region (to be reserved as a transmission region for the relay station).

The RS receives this DL-MAP data, and transmits to the MS, at the timing (T1) defined in the DL-MAP data, the relay data already received from the BS. It is assumed here that the RS transmits the data to the MS without performing an error detection process on the data received from the BS. However, as a matter of course, the RS may perform an error detection process on the received data.

The MS also receives the DL-MAP data from the BS, and performs a receiving operation at the timing (T1) defined in the DL-MAP data to receive the user data addressed to the MS that is relayed by the RS. The MAP data for reporting the timing T1 includes a connection ID assigned to the MS, and therefore, the MS can acquire region definition information corresponding to the connection ID assigned to itself, and also detect the data transmission timing for itself. The transmitted data (user data) also includes the connection ID, and therefore, if transmitted data addressed to another MS is multiplexed, the MS can separate the data addressed to itself from other data and acquire the data addressed to itself.

In this example, the data transmission region used for transmitting the relay data from the BS to the RS and the data transmission region used for transmitting the relay data from the RS to the MS are defined in separate subframes; however, if the transmission process by the RS can be performed in time with that of the BS, the initial MAP data can define both data transmission processes to be performed in the same subframe. Hence, the relay data from the BS to the RS and the relay data from the RS to the MS can be transmitted in the same downlink transmission subframe.

The MS that has received the relay data uses error detection information included in the relay data (e.g., CRC bit) to determine whether there is an error in the received data. The relay data is preferably error-correcting-encoded (e.g., turbo encoded, convolutional encoded), and the received data is decoded before performing error detection.

In the transmission region (for MS) defined in the next UL-MAP data for a reception result, a reception result indicating whether the data has been properly received is transmitted. The reception result includes, for example, an error detection result expressed by an ACK signal (error not detected) or a NACK signal (error detected). A signal indicating a request to resend the data (resending request) can be used to express that the data has not been properly received, and a signal indicating a request not to resend the data can be used to express that the data has been properly received. It is also possible to express that the data has been properly received by not transmitting a signal indicating a resending request, and to express that the data has not been properly received by transmitting a signal indicating a request not to resend the data. In either case, it can be considered that a reception result is being transmitted.

In a case where the BS directly receives this reception result from the MS (not shown), the process returns to the beginning of the sequence, and the BS resends the relay data to the RS (the BS had saved the data to be resent), and the RS resends the relay data to the MS.

In the example shown in FIG. 3, the RS receives the reception result from the MS. The RS receives UL-MAP data from the BS, and recognizes the transmission region (for MS) of the reception result, which region is defined in the received UL-MAP data. Hence, the RS can receive the reception result transmitted by the MS in the recognized transmission region.

In the transmission region (for RS) of the reception result, which region is defined in the next UL-MAP data, the RS transmits the reception result received from the MS (with or without error) to the BS.

Then, the process returns to the beginning of the sequence, and the BS resends the relay data to the RS (the BS had saved the data to be resent), and the RS resends the relay data to the MS.

In the above-described manner, even when the communication is performed via a relay station, data can be efficiently resent from the BS to the MS.

The resending operation in the uplink direction can be controlled by the same method.

"Apparatus configuration"

Figure 4:
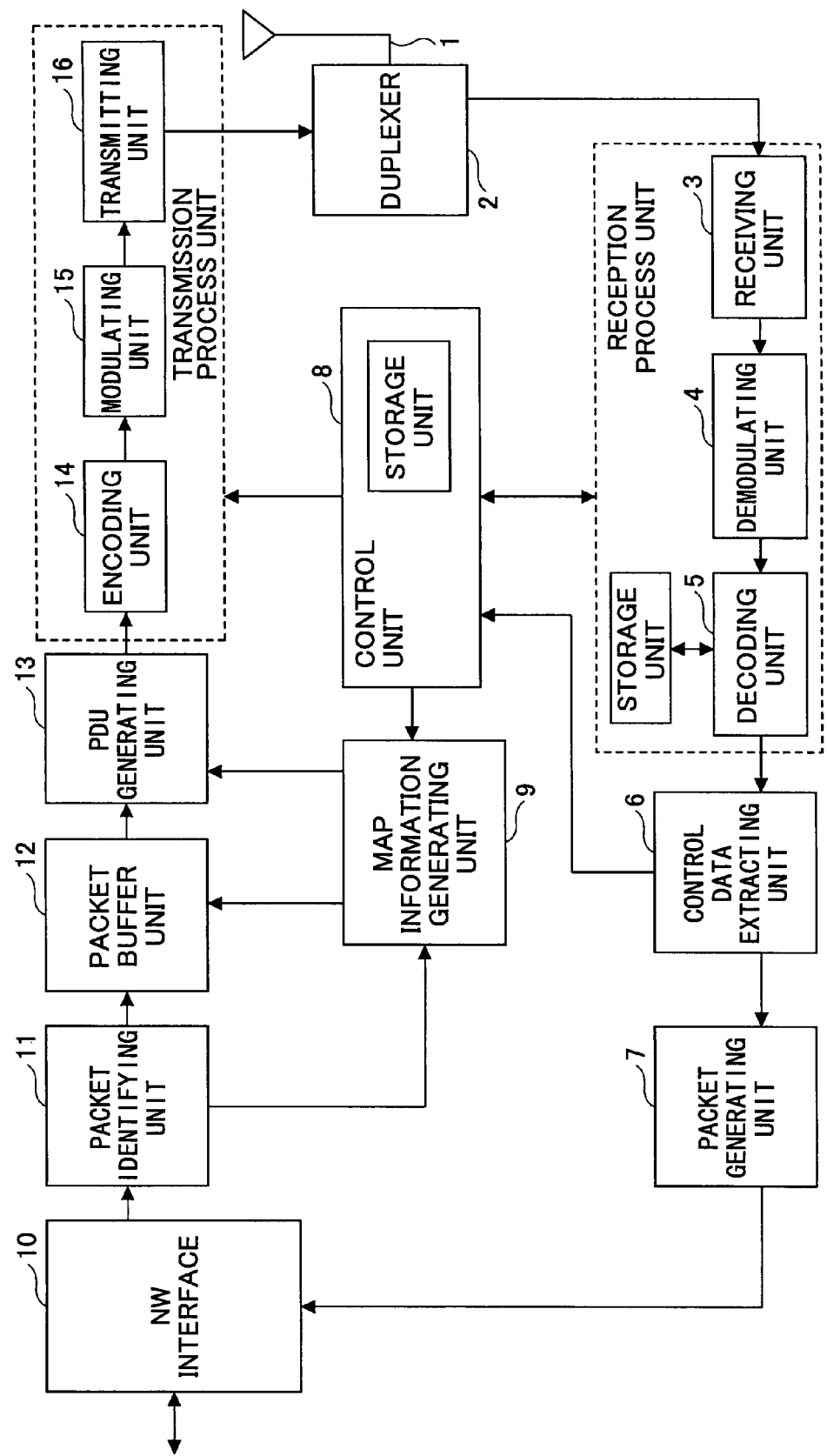
FIG. 4 is a block diagram of a BS in the radio communication system according to the first embodiment of the present invention.
Figure 5:
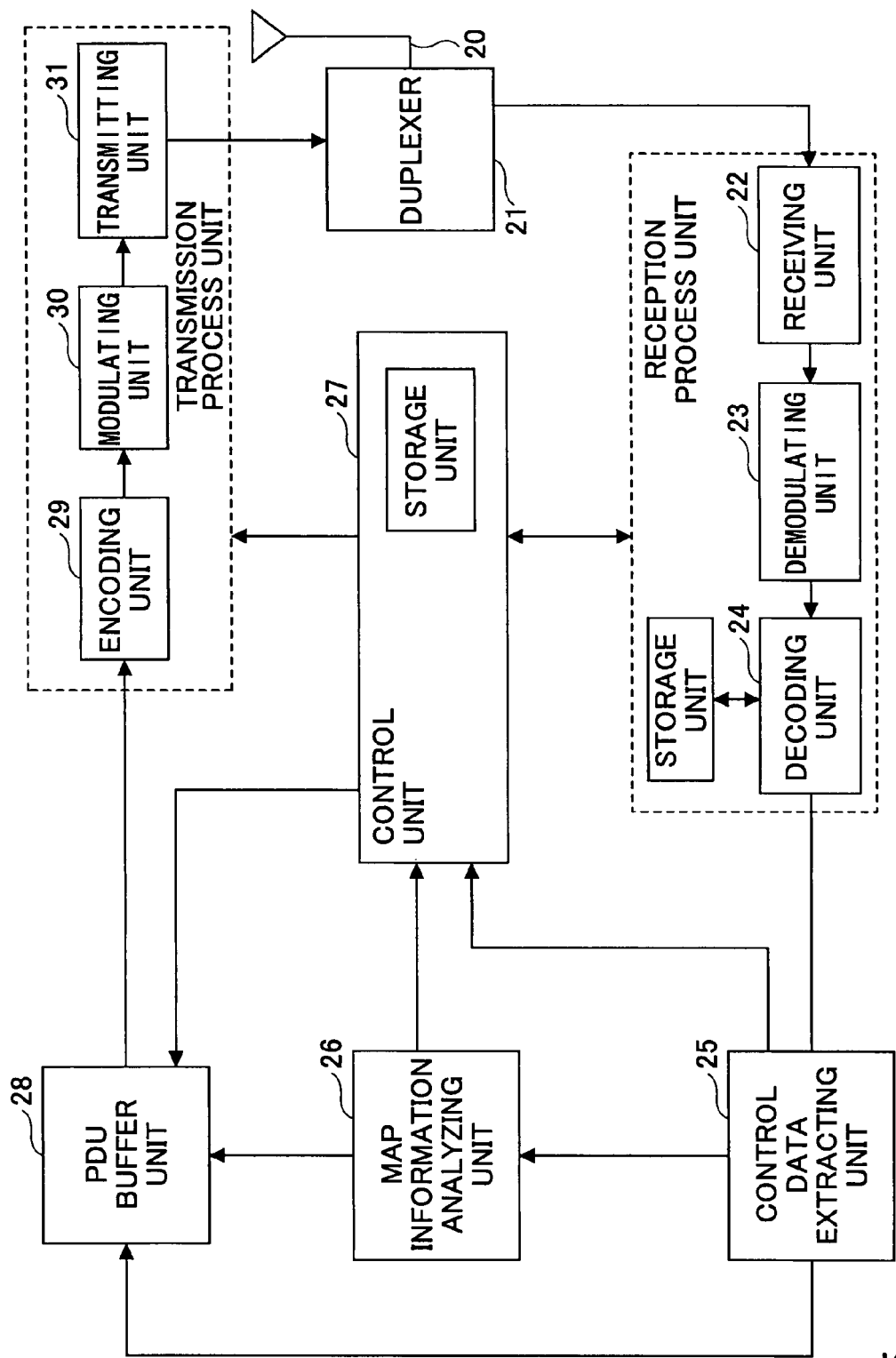
FIG. 5 is a block diagram of an RS in the radio communication system according to the first embodiment of the present invention.

FIGS. 4 and 5 illustrate configurations of the BS and RS, respectively.

The configuration of the BS is described with reference to FIG. 4.

In FIG. 4, 1 denotes an antenna for transmitting/receiving radio signals to/from the RS and MS; 2 denotes a duplexer provided so that the antenna 1 can be used for both transmission and reception; 3 denotes a receiving unit; 4 denotes a demodulating unit for demodulating received signals; 5 denotes a decoding unit for decoding received signals demodulated by the demodulating unit 4; 6 denotes a control data extracting unit for extracting control data (e.g., a reception result) from the decoded data, providing the control data to a control unit 8, and transferring data other than the control data (e.g., user data) to a packet generating unit 7; and 7 denotes the packet generating unit for packetizing the data transferred from the control data extracting unit 6 and passing the packetized data to a NW interface 10.

The decoding unit 5 performs an error detection process on the received data after being decoded and provides the results to the control unit 8. When an error is detected from the received data, the decoding unit 5 reports the error to the control unit 8, and saves the received data before being decoded into a storage unit in a reception process unit (the reception process unit includes the receiving unit 3, the demodulating unit 4, and the decoding unit 5). The received data before being decoded is saved in the storage unit to be combined with data to be resent that is received the next time (for HARQ). The received data before being decoded does not need to be saved in the storage unit if the combination process is unnecessary.

Furthermore, 10 denotes the NW interface (for performing packet communication in this example) between a not shown routing apparatus (an apparatus that is connected to plural radio base stations for controlling the route of data such as packet data), and 11 denotes a packet identifying unit for identifying the IP address included in packet data received from the NW interface 10, determining the address MS according to the IP address data (e.g., IP address data is stored beforehand in association with the IDs of MSs, and the ID of the corresponding MS is acquired), acquiring QOS information corresponding to the ID (QOS information items are stored in association with IDs), transmitting the ID and the QOS information to a MAP information generating unit 9 to request assignment of a band, and saving the packet data received from the NW interface 10 in a packet buffer unit 12.

Furthermore, 9 denotes the MAP information generating unit. When a request for a band is received, the MAP information generating unit 9 uses the ID of the MS as a search key to determine the communication path (determine the relay station through which the data is to pass), generates MAP data defining a mapping area corresponding to the QOS as one of the downlink data transmission regions, and transmits an instruction to a PDU generating unit 13 to form a radio frame according to the generated MAP data. Moreover, when there is a message (signal) to be transmitted from the BS according to an instruction from the control unit 8, the MAP information generating unit 9 creates MAP data defining the transmission region for transmitting the message, and passes the MAP data to the PDU generating unit 13 together with a preamble.

Furthermore, 13 denotes the PDU generating unit, which generates a PDU so that MAP data and transmitted data (acquired from the packet buffer unit 12) are saved in each of the regions of the radio frames that are formed based on synchronization signals (preambles), and transmits the PDU to an encoding unit 14. The packet buffer unit 12 saves the data without deleting it until data transmission to the MS is successfully completed. Accordingly, a resending operation can be controlled.

Furthermore, 14 denotes the encoding unit, 15 denotes a modulating unit, and 16 denotes a transmitting unit. In the stated order, the encoding unit 14 performs an encoding process such as error encoding on the PDU data, the modulating unit 15 modulates the PDU data after being encoded, and the transmitting unit 16 transmits the PDU data as radio signals through the antenna 10.

Furthermore, 8 denotes the control unit for controlling all of the units in the BS.

The control unit 8 includes a storage unit for storing various data items that need to be held by the BS (e.g., communication paths).

Moreover, the control unit 8 acquires control data such as reception result information from the MS or the RS through the control data extracting unit 6. When it is necessary to resend data, the control unit 8 reads the data once again from the packet buffer unit 12, and executes the resending operation by controlling the PDU generating unit 13. In order to define a transmission region for this operation, the MAP information generating unit 9 generates MAP data defining a transmission region from the BS to the RS and MAP data defining a transmission region from the RS to the MS in the stated order, and provides the generated MAP data to the PDU generating unit 13 in the stated order so as to be transmitted.

When a report that an error has been detected in the received data is received from the reception process unit, the control unit 8 generates reception result information and passes it to the MAP information generating unit 9. The MAP information generating unit 9 generates DL-MAP data defining a transmission region for the reception result information, and controls the PDU generating unit 13 to transmit the MAP data and the reception result information. If the reception result indicates that there is an error, uplink transmission regions are assigned for the MS and the RS in the stated order, so that the data can be resent from the MS.

In the first embodiment, when the MS receives data from the BS via the RS or when the BS receives data from the MS via the RS, the MS or BS can save the data even if an error is included. Then, when resent data is received, the saved data can be combined with the resent data. For example, the data can be combined by averaging likelihood information indicating the likelihood of received bits, and the likelihood information can be used to perform a turbo decoding process once again in order to effectively use the received data (to perform HARQ).

The configuration of the RS is described with reference to FIG. 5.

In FIG. 5, 20 denotes an antenna for transmitting/receiving radio signals to/from the BS and MS; 21 denotes a duplexer provided so that the antenna 20 can be used for both transmission and reception; 22 denotes a receiving unit; 23 denotes a demodulating unit for demodulating received signals; 24 denotes a decoding unit for decoding received signals demodulated by the demodulating unit 23; 25 denotes a control data extracting unit for extracting MAP data (received from the BS) from the decoded data, providing the MAP data to a MAP information analyzing unit 26, and transferring data addressed to the MS received from the BS to a PDU buffer unit 28. Similarly, when radio signals are received from the MS, the control data extracting unit 25 transfers the received data to the PDU buffer unit 28 so as to be transmitted to the BS.

The control data extracting unit 25 passes the extracted control data to a control unit 27.

Furthermore, 27 denotes the control unit for controlling all of the units in the RS.

The control unit 27 includes a storage unit for storing various data that needs to be held by the RS.

The MAP information analyzing unit 26 analyzes MAP data transferred from the control data extracting unit 25, and provides the results to the control unit 27. Accordingly, the control unit 27 controls downlink and uplink communication with the BS (MMR link) and downlink and uplink communication with the MS according to the DL-MAP and the UL-MAP received from the BS.

A packet buffer unit (not shown) transfers packet data to the PDU buffer unit 28 in order to perform radio communication according to the MAP data from the MAP information analyzing unit 26.

Furthermore, 29 denotes an encoding unit and 30 denotes a modulating unit. The encoding unit 29 encodes transmitted data received from the PDU buffer unit 28. The modulating unit 30 modulates the data so that the user data is transmitted at a transmission timing and with a channel obtained as a result of the analysis by the MAP information analyzing unit 26, and passes the data to a transmitting unit 31.

Furthermore, 31 denotes the transmitting unit, and transmits transmission signals as radio signals through the antenna 20 to the MS and BS. The PDU buffer unit 28 saves the data without deleting it until data transmission to the MS (BS) is successfully completed. With the saved data, a resending operation can be controlled. The control unit 27 controls the transmitting unit 31 to function as a reporting unit for reporting reception results to the BS.

The configuration of the MS is substantially the same as the RS shown in FIG. 5.

However, data that is transferred from the control data extracting unit 25 to the PDU buffer unit 28 is output to an output unit such as a display unit, and data provided from an input unit is input to the PDU buffer unit 28. Moreover, the MS is to perform transmitting/receiving operations according to MAP data received from the BS (MAP data defining the transmitting/receiving timings for the MS), and analyzed by the MAP information analyzing unit 26.

In this manner, in a situation where the BS is controlling the transmitting/receiving timings in the radio communication system, when a resending operation needs to be controlled, the BS receives a report to that effect (e.g., the BS receives a request to have a transmitting timing assigned). Thus, the BS can control transmitting timings (i.e., create MAP data) in consideration of the report. Accordingly, it is not necessary to add a function to the RS for controlling the transmitting/receiving timings in the radio communication system.

Next, descriptions are first given of uplink data transmission (see second embodiment) and then of downlink data transmission (see third embodiment).

[b] Description of Second Embodiment

In the first embodiment, when data is transmitted from a transmitting side apparatus (e.g., BS) via the RS to a receiving side apparatus (e.g., MS), and a resending operation is to be performed, the data is resent once again from the transmitting side apparatus (e.g., BS) via the RS to the receiving side apparatus (e.g., MS).

In the second embodiment, the RS is used in an effective manner so that radio transmission is performed more efficiently.

For example, in a case where the RS receives data from the MS (BS) and relays the received data to the BS (MS), and then the BS (MS) makes a resending request, the data can be resent originating from the RS. The data is preferably resent originating from the RS only when the RS can acquire properly received data from the transmitting side, apparatus. If the RS cannot decode properly received data, and the data is resent originating from the RS, it is unlikely that data will be properly decoded at the receiving side apparatus.

Accordingly, when data is to be resent, the data does not need to be resent originating from the transmitting side apparatus to the RS, and therefore, radio resources can be used efficiently.

Furthermore, it is possible to eliminate the risk that transmission to a first RS is successful but a resending operation to a next RS is unsuccessful.

Furthermore, when the RS cannot acquire properly received data, the RS prompts the transmitting side apparatus to resend the data, and therefore, the resending operation can be performed faster compared to a case where the receiving side apparatus needs to prompt the transmitting side apparatus to resend the data.

Furthermore, in a situation where the BS is controlling the transmitting/receiving timings in the radio communication system, when a resending operation needs to be controlled, the BS receives a report to that effect (e.g., the BS receives a request to have a transmitting timing assigned). Thus, the BS can control transmitting timings (i.e., create MAP data) in consideration of the report. Accordingly, it is not necessary to add a function to the RS for controlling the transmitting/receiving timings in the radio communication system.

"Uplink data transmission (part 1)"

Figure 6:
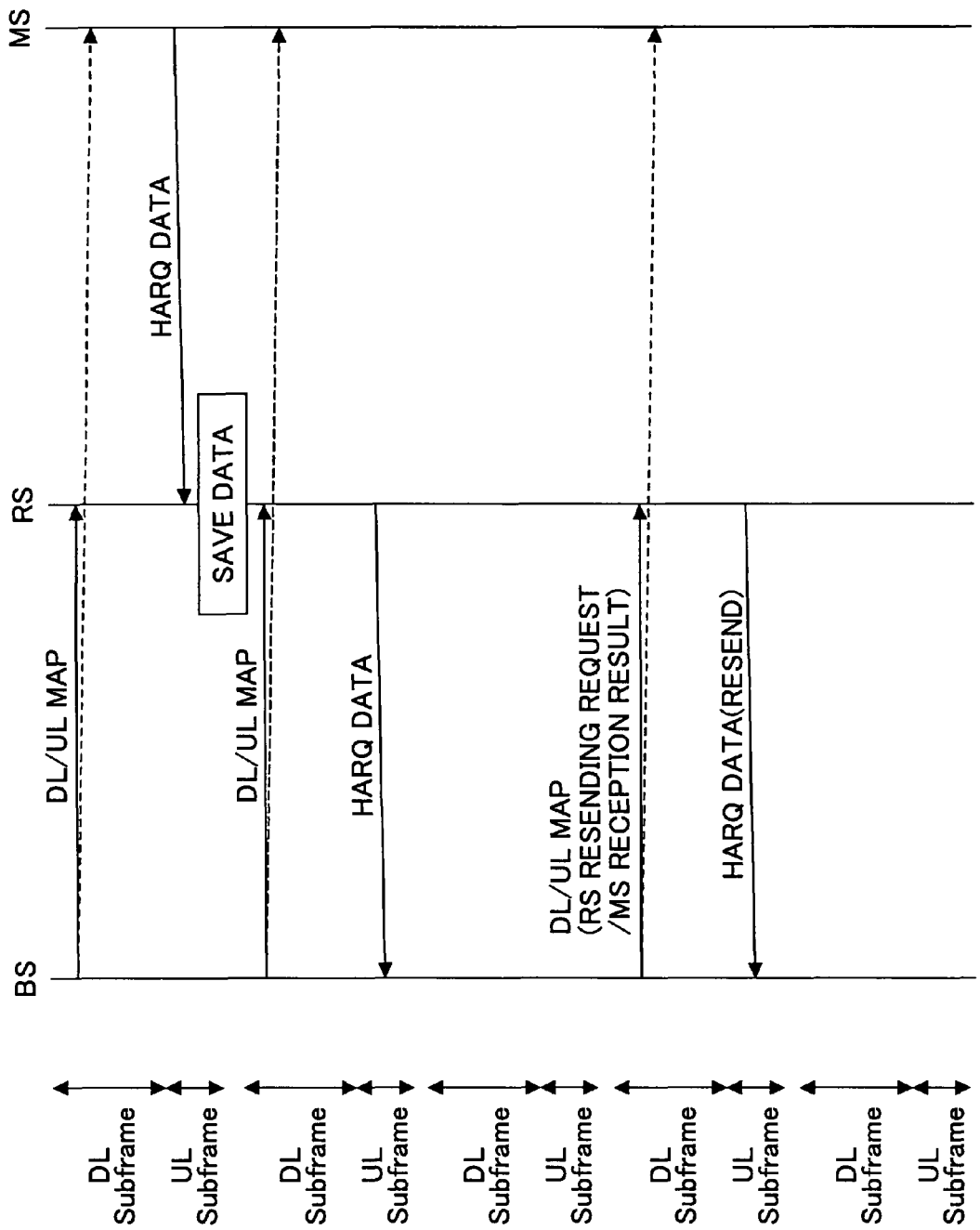
FIG. 6 is a sequence diagram of uplink data transmission (part 1) according to a second embodiment of the present invention.
Figure 7:
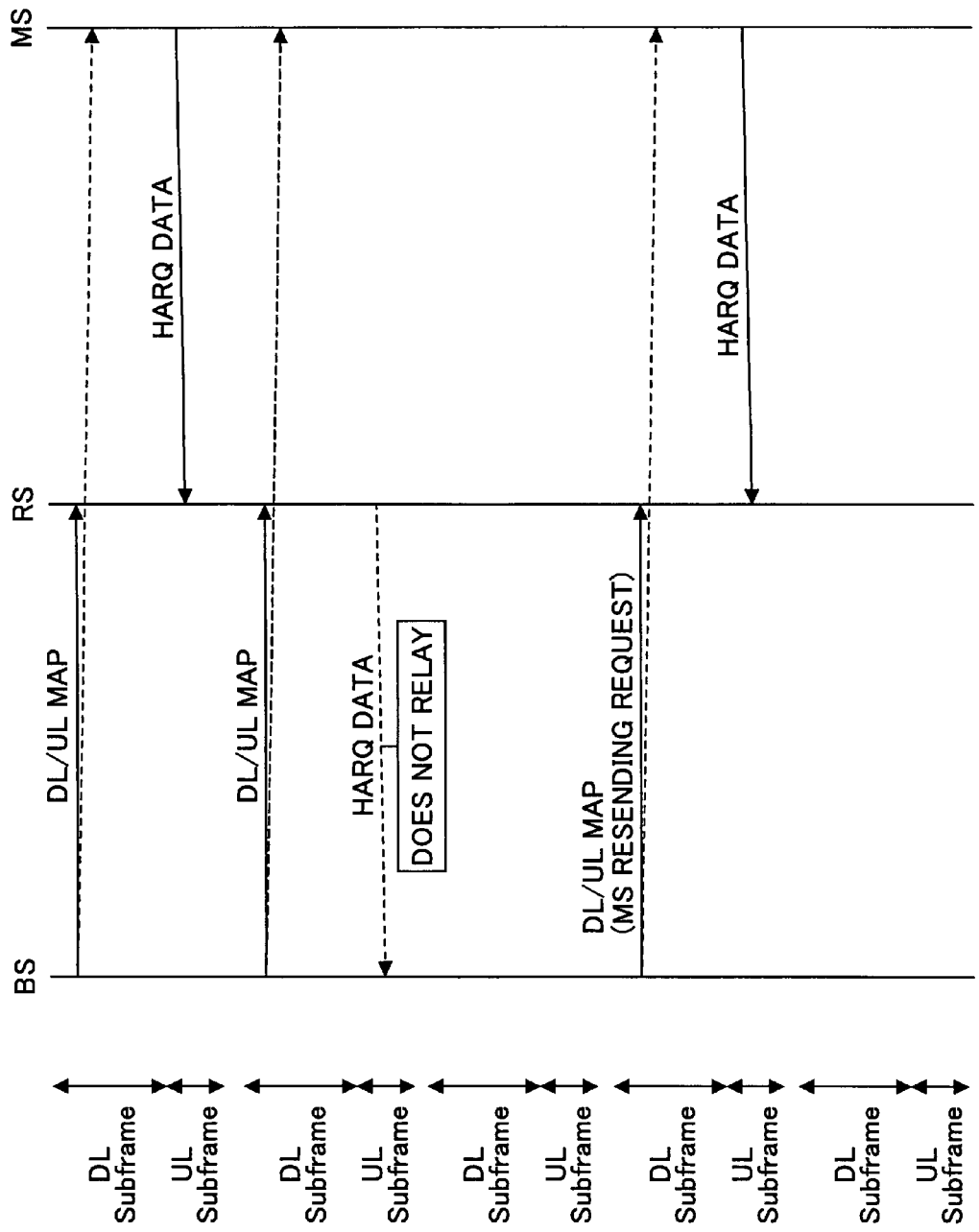
FIG. 7 is a sequence diagram of uplink data transmission (part 1) according to the second embodiment of the present invention.

FIGS. 6 and 7 are sequence diagrams of uplink data transmission (part 1).

Figure 8:
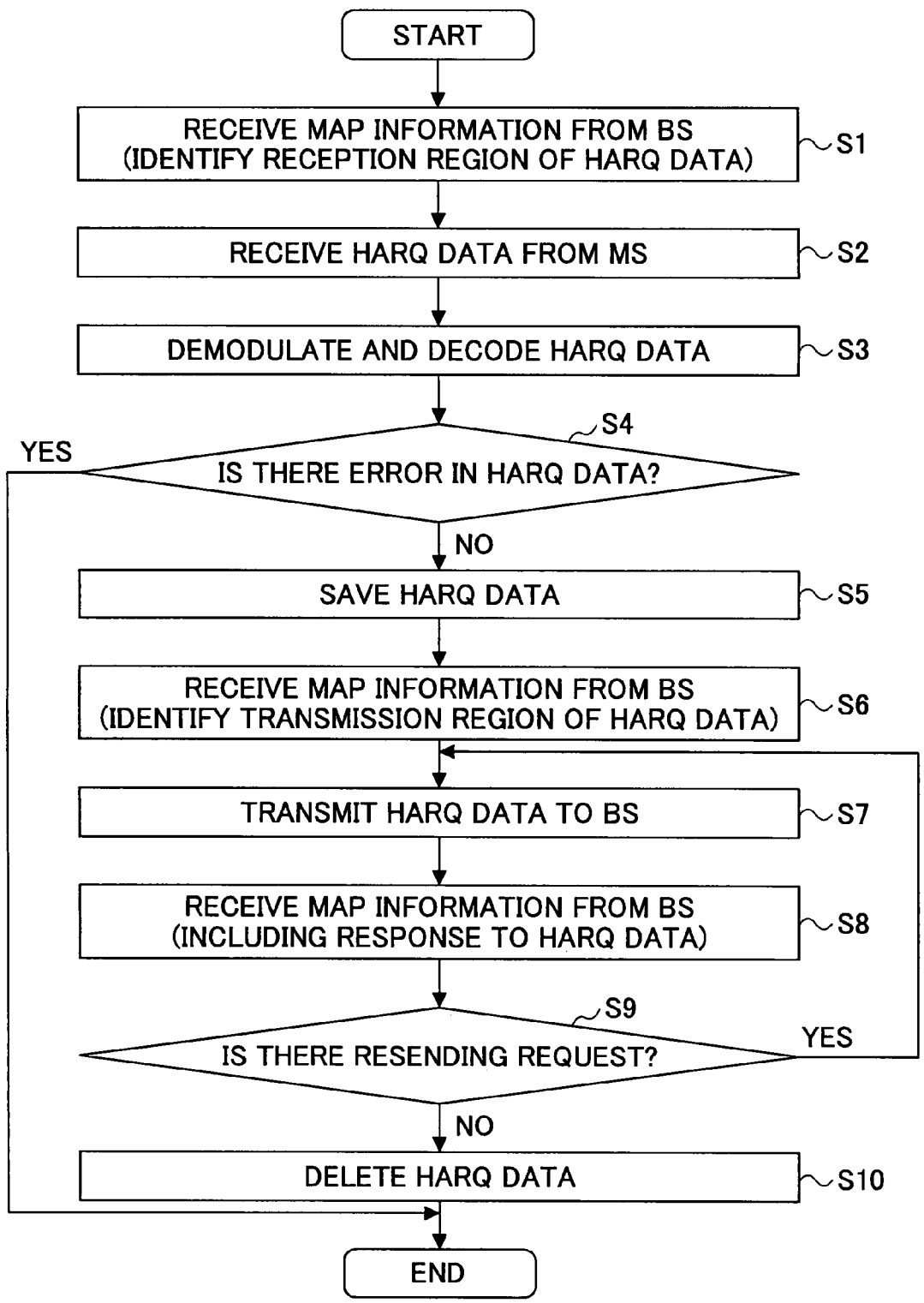
FIG. 8 illustrates an operation flow (part 1) of the RS according to the second embodiment of the present invention.
Figure 9:
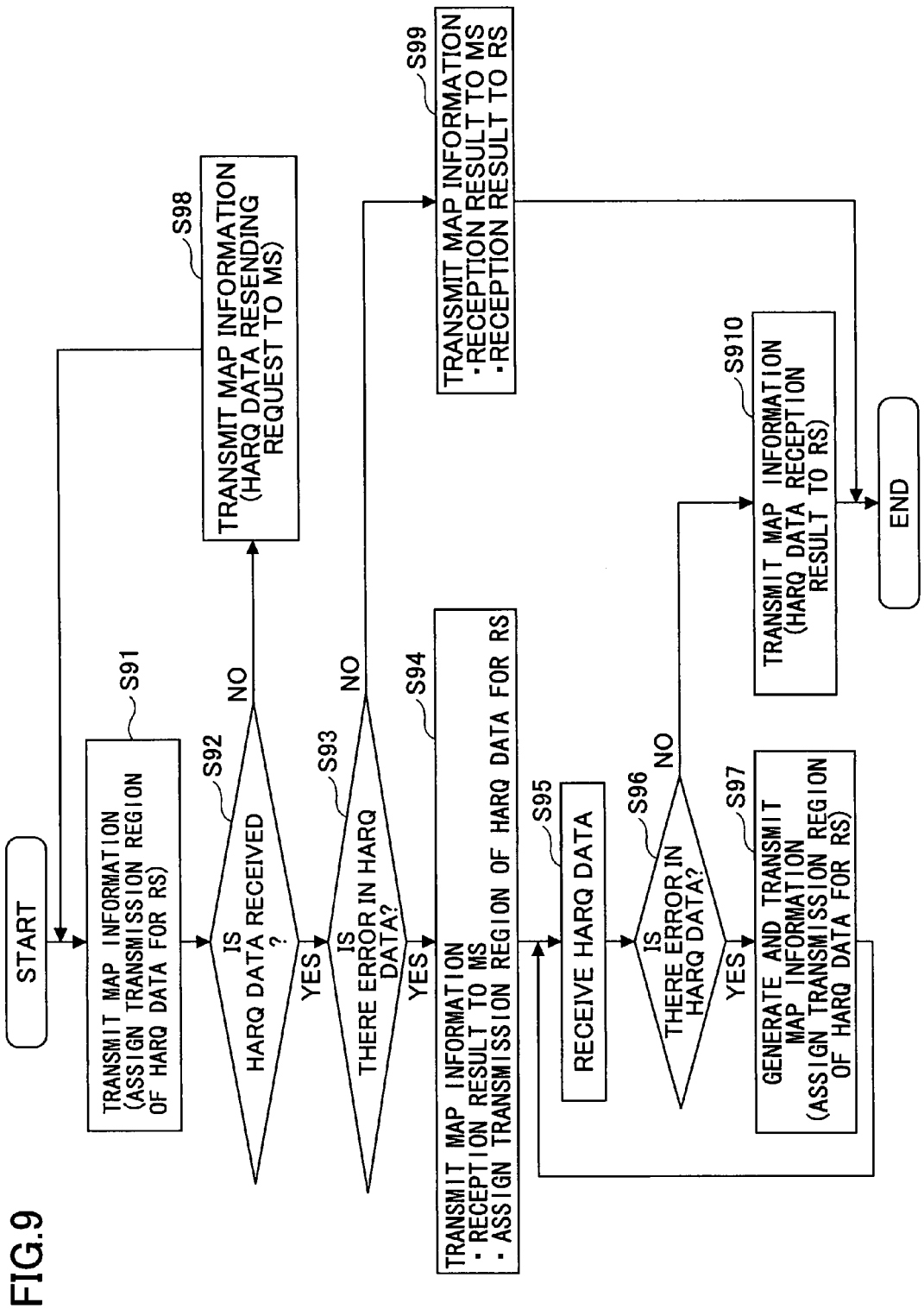
FIG. 9 illustrates an operation flow (part 1) of the BS according to the second embodiment of the present invention.

FIGS. 8 and 9 illustrate operation flows (part 1) of the RS and the BS, respectively.

In this example, HARQ is employed for controlling the resending operation, and data that is the target of HARQ control is referred to as HARQ data. In a case where ARQ control is employed, the received data does not need to be saved for the purpose of combining data.

Referring to FIG. 6, the BS acquires, from the packet buffer unit 12, a preamble, MAP data, and data corresponding to a region defined by the MAP data, which are generated by the MAP information generating unit 9, forms a subframe at the PDU generating unit 13, and transmits the subframe from the transmitting unit 16 via the antenna 1.

The RS and the MS receive the MAP data from the BS, analyze the DL-MAP data and the UL-MAP data at their respective MAP information analyzing units 26, and recognize the transmission/reception region pertinent to them. This can be determined by each of them using a connection ID assigned to itself.

In this case, a transmission region is assigned for the MS by the UL-MAP data, and therefore, the transmission process unit (including the encoding unit 29, the modulating unit 30, and the transmitting unit 31) is controlled so that data input from the input unit is transmitted as HARQ data in the assigned transmission region. The transmitted data is saved in a storage unit of the transmission process unit, to be prepared for the resending operation.

Meanwhile, in the RS, the MAP information analyzing unit 26 detects that a transmission region has been assigned for the MS by the UL-MAP data, and thus reports a receiving timing to the control unit 27. The control unit 27 of the RS receives HARQ data transmitted from the MS by controlling a reception process unit (including the receiving unit 22, the demodulating unit 23, and the decoding unit 24).

The decoding unit 24 decodes the received data, performs an error detection process on the received data by using error detection codes (e.g., CRC bit), and provides the results to the control unit 27.

If no errors are detected, the decoded data is provided to the PDU buffer unit 28 via the control data extracting unit 25.

Next, the BS that assigned the transmission region for the MS assigns a transmission region for the RS, so that the RS can transmit the HARQ data received from the MS. Accordingly, the BS creates UL-MAP data defining the transmission region for the RS, and provides the created UL-MAP data to the PDU generating unit 13, so that the UL-MAP data is transmitted from the transmitting unit 16.

The RS receives the UL-MAP data, detects the transmission region with the MAP information analyzing unit 26, and reports the transmission region to the control unit 27.

In the RS, the control unit 27 has received a report from the reception process unit that the HARQ data received from the MS does not have an error (the report of the error detection result can be saved in the storage unit). Therefore, the control unit 27 provides the HARQ data saved in the PDU buffer unit 28 to the encoding unit 29, and controls the transmission process unit to transmit the HARQ data through the transmission region detected by the MAP information analyzing unit 26. The PDU buffer unit 28 saves the data without deleting it until data transmission to the BS is successfully completed, so that a resending operation can be performed according to need.

In the BS, the control unit 8 controls the reception process unit to perform a receiving operation in the transmission region assigned for the RS, and to receive the HARQ data relayed by the RS. The decoding unit 5 decodes the received HARQ data, performs an error detection process on the HARQ data, and provides the results to the control unit 8.

If no errors are detected, the received HARQ data is provided to the NW interface 10 via the packet generating unit 7. Then, the BS transmits a report of the reception result (that proper reception has been confirmed) to the MS and RS. For example, the MAP data includes a message to the RS and MS that resending is unnecessary. Instead of being sent in the MAP data, the message that resending is unnecessary can be saved in data areas defined by the DL-MAP data for the RS and MS. It is also possible to report that resending is unnecessary by not transmitting a resending request.

When the report that resending is unnecessary is received, the MS and RS do not resend data.

When the control unit 8 receives a report that an error is detected, the BS reports to the RS, as the reception result, that data has not been properly received. However, the BS reports to the MS that data has been properly received (resending is unnecessary). The BS can transmit a resending request as the reception result. The BS can make a resending request by not reporting that resending is unnecessary (including cases where proper reception is confirmed).

A resending request and a report that resending is unnecessary can be saved in MAP data addressed to the RS, MAP data addressed to the MS, and in data transmission regions defined by the DL-MAP data for the RS and MS.

Accordingly, the MAP information analyzing unit 26 or the control unit 27 of the MS recognizes that resending is unnecessary, and therefore, the MS does not resend data. Meanwhile, the MAP information analyzing unit 26 or the control unit 27 of the RS recognizes that resending is necessary, and therefore, the RS resends the HARQ data. Hence, the control unit 27 of the RS controls the transmission process unit to resend the HARQ data saved in the PDU buffer unit 28.

The transmission region used for resending is defined in the UL-MAP data; however, it is preferably defined in the same MAP data as the MAP data including the resending request. For example, the UL-MAP data defines both the resending request and the data transmission region to be used for resending. These pieces of information can be saved in separate portions of the same MAP data, and the MAP data can be transmitted in this manner. Furthermore, the resending request can be saved in the transmission data region defined by the DL-MAP data for the RS.

The HARQ data resent from the RS is received by the reception process unit of the BS, and is combined with the data already received and saved in the storage unit. The combined data is decoded and then subjected to an error detection process.

If an error is detected, a reception result will be sent (a resending request will be sent) only to the RS. If no errors are detected, a reception result will be sent (that resending is unnecessary or proper reception has been confirmed) to the RS.

FIG. 7 is a sequence diagram of a process performed when an error is detected in the HARQ data from the MS received by the RS.

In this case, the decoding unit 24 of the RS detects an error in the received HARQ data after being decoded. Therefore, the decoding unit 24 transmits a report to the control unit 27 that an error has been detected, and saves the received HARQ data before being decoded in the storage unit of the reception process unit (to be combined with data to be resent). As the report that an error has been detected is received, the control unit 27 controls the RS not to transmit the HARQ data to the BS.

That is, the RS can report a reception result to the BS (that the RS has not properly received data) by not transmitting the HARQ data to the BS.

As the HARQ data is not transmitted by the RS, the control unit 8 of the BS determines that the MS needs to resend the HARQ data, and transmits a resending request to the MS. For example, the MAP information generating unit 9 is controlled so that a transmission region to be used by the MS for resending HARQ data is defined in UL-MAP data and a reception result (resending control signal) to be sent to the MS is written in the UL-MAP data. It is also possible to define a data transmission region for the MS in DL-MAP data and save the resending control signal in the defined region.

The MAP data generated by the MAP information generating unit 9 is transmitted from the transmitting unit 16 of the BS and received by the RS and MS.

The MS reads the HARQ data saved in the PDU buffer unit 28, performs an encoding process, etc. on the HARQ data read (the encoding process can be omitted if encoded data is saved), and controls the transmission process unit so that the HARQ data is transmitted through the transmission region defined by the UL-MAP data transmitted from the BS.

The RS recognizes that the MS will resend data according to the MAP data transmitted from the BS, and receives the resent HARQ data from the MS. The decoding unit 24 of the RS combines the received HARQ data with the data saved in the storage unit of the reception process unit, decodes the combined data once again, and performs an error detection process on the decoded data. A report as to whether an error is detected is reported to the control unit 27. If no errors are detected, as shown in FIG. 6, the HARQ data is transmitted to the BS and subsequent processes follow. If an error is detected, as shown in FIG. 7, the HARQ data is not transmitted to the BS and subsequent processes follow.

FIG. 8 is a flowchart of a process performed by the RS.

The RS recognizes that HARQ data will be transmitted from the MS according to UL-MAP data transmitted from the BS, and identifies the reception region (step S1).

The reception process unit of the RS receives the HARQ data transmitted from the MS in the identified reception region (step S2), and demodulates and decodes the received HARQ data (step S3).

The decoding unit 24 of the RS performs an error detection process on the decoded HARQ data, and if an error is detected, the process ends (step S4). That is, the RS does not transmit HARQ data to the BS.

On the other hand, if no errors are detected, the process proceeds to step S5.

In step S5, the RS saves the HARQ data received from the MS in the PDU buffer unit 28.

The RS receives UL-MAP data from the BS, and identifies the transmission region for transmitting the HARQ data (step S6).

The RS transmits, to the BS, the HARQ data received from the MS, through the identified transmission region (step S7). Even if this transmission is performed, the HARQ data saved in the PDU buffer unit 28 is not yet deleted, in order to be prepared for a resending operation.

The RS receives MAP data from the BS (step S8).

The RS determines whether there is a resending request from the BS according to reception result information held in the MAP data transmitted from the BS (or burst data in the reception region defined by the MAP data for the RS) (step S9). The RS can also determine that there is a resending request from the BS by not receiving, from the BS, a signal (e.g., ACK) indicating that the data has been properly received at a predetermined timing.

When the RS determines that there is a resending request, the process returns to step S7. The RS reads the HARQ data saved in step S5 from the PDU buffer unit 28 and resends the HARQ data to the BS.

On the other hand, when the RS determines that there is no resending request, the process proceeds to step S10, and the RS deletes the HARQ data saved in step S5, so that the space in the PDU buffer unit 28 can be used for saving subsequent data.

FIG. 9 is a flowchart of a process performed by the BS.

The MAP information generating unit 9 of the BS transmits, from the transmitting unit 16, UL-MAP data assigning a transmission region of HARQ data for the MS, and then creates UL-MAP data assigning a transmission region for the RS so that the HARQ data can be transmitted from the RS to the BS (step S91).

The BS determines whether HARQ data has been transmitted from the RS in the defined transmission region (step S92).

When the BS determines that the HARQ data is not transmitted, the BS concludes that the RS has not properly received the HARQ data from the MS, and transmits to the MS a reception result (resending request) indicating that the data has not been properly received, in order to request the MS to resend the HARQ data (step S98). The resending request can be transmitted in association with a connection ID of the MS in MAP data. Furthermore, the resending request can be made to the MS by saving the resending request in a data area corresponding to the transmission region defined by the DL-MAP data. Moreover, it is possible to prompt the MS to resend data by not transmitting, to the MS, a signal (e.g., ACK) indicating that the data has been properly received.

When the BS receives the HARQ data from the RS, the HARQ data is received, demodulated, and decoded. The BS determines whether the decoded HARQ data includes an error (step S93).

If no errors are detected, the BS transmits a reception result (e.g., ACK) indicating that the data has been properly received, to the MS and RS (step S99). The ACK can be transmitted in association with a connection ID of the RS and MS in the MAP data. Furthermore, the ACK can be reported to the RS and MS by being saved in a data area corresponding to the transmission region defined by the DL-MAP data. Moreover, it is possible to report to the RS and MS that the HARQ data has been properly received by not making a resending request to the RS and MS.

In step S93, when an error is detected in the HARQ data, the received HARQ data before being decoded is saved in the storage unit of the reception process unit. The MAP information generating unit 9 creates and transmits MAP data (step S94). The MAP data includes a reception result (e.g., ACK) to be sent to the MS, indicating that the data has been properly received, and also includes a transmission region defined for the RS to resend data. A signal indicating a resending request to the RS can be included in the MAP data. It is also possible to report that the data has been properly received to the MS by not making a resending request to the MS.

The BS receives the HARQ data from the RS in the defined transmission region (step S95), combines the received HARQ data with the data saved in the storage unit of the reception process unit, decodes the combined data, and performs an error detection process on the decoded data (step S96).

If no errors are detected, the BS transmits a signal (e.g., ACK) indicating that the HARQ data has been properly received to the RS (step S910). This signal can be transmitted inside the MAP data or in the transmission region defined by the MAP data. Moreover, it is possible to report to the MS that the HARQ data has been properly received by not making a resending request but transmitting an ACK signal to the RS.

On the other hand, if an error is detected in the HARQ data, the BS creates MAP data assigning a transmission region of the HARQ data for the RS, and transmits the MAP data (step S97). The BS can assign a transmission region for the RS as well as save a resending request in the MAP data or in a data area defined by the MAP data.

The BS then receives the HARQ data resent by the RS (step S95), combines the received HARQ data with the data saved in the storage unit of the reception process unit, and performs decoding and error detection processes on the combined data (step S96).

Subsequent processes are similar to those of the above description.

"Uplink data transmission (part 2)"

Next, a modification of the uplink data transmission (part 1) is described.

Figure 10:
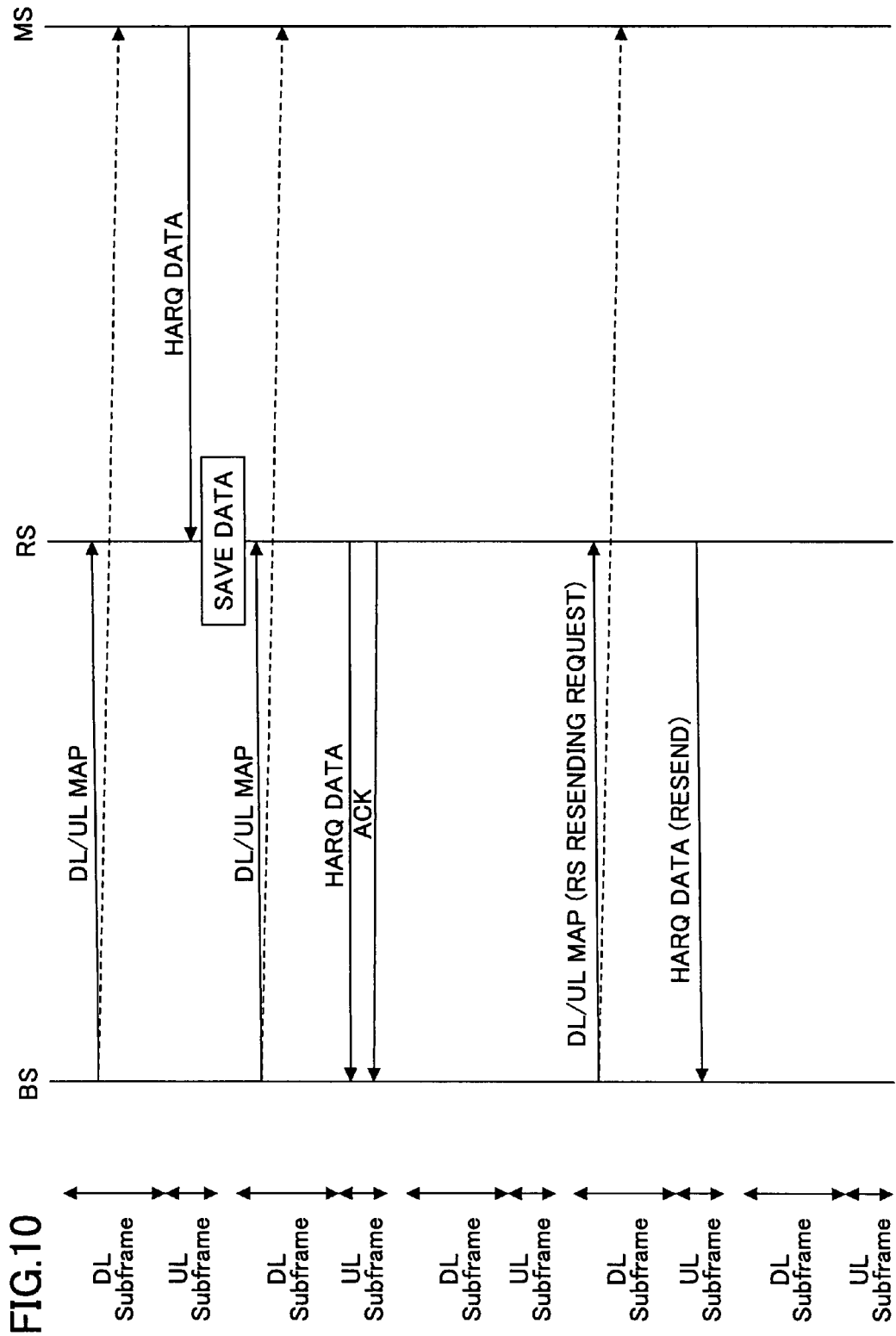
FIG. 10 is a sequence diagram of uplink data transmission (part 2) according to the second embodiment of the present invention.
Figure 11:
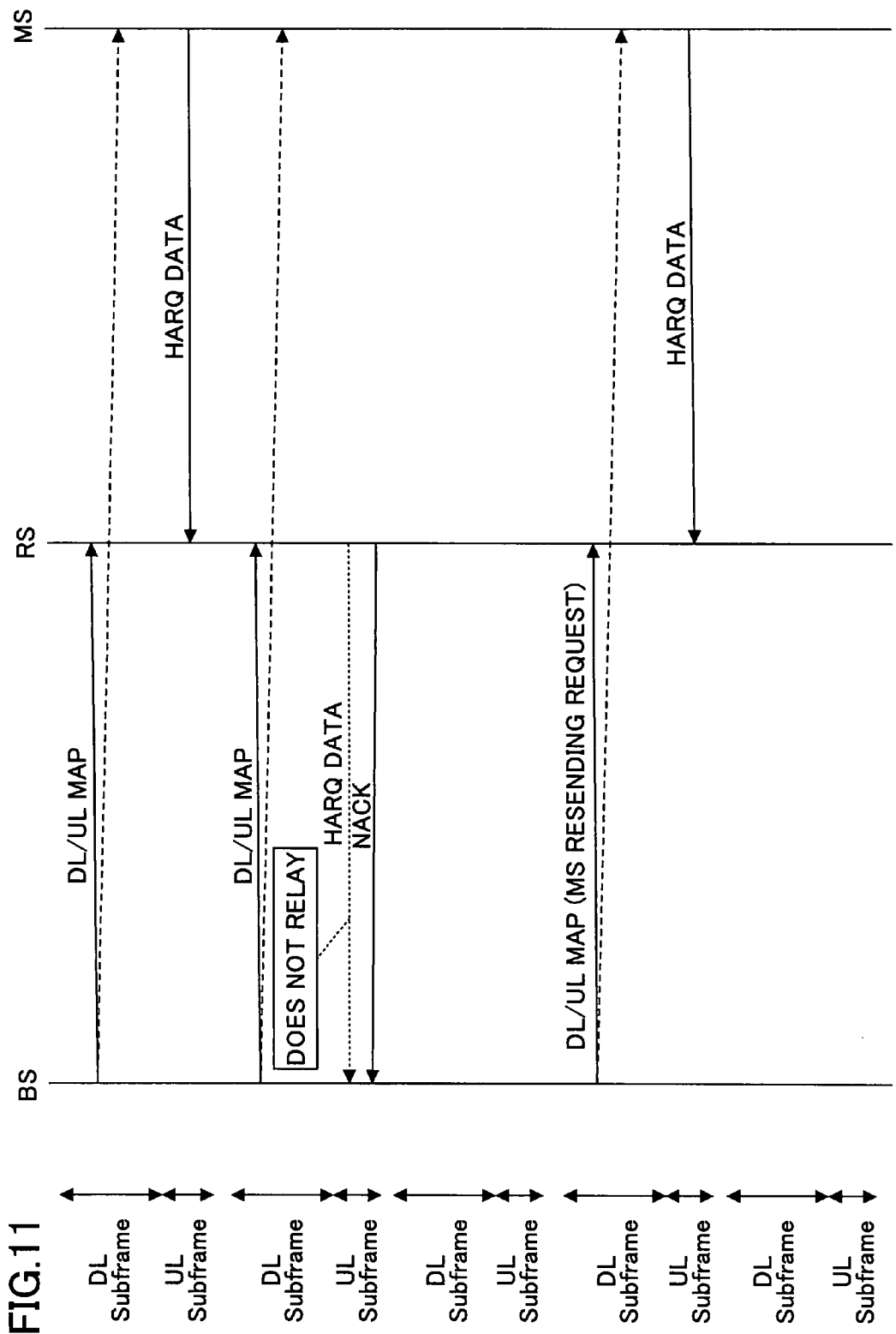
FIG. 11 is a sequence diagram of uplink data transmission (part 2) according to the second embodiment of the present invention.

FIGS. 10 and 11 are sequence diagrams of uplink data transmission (part 2).

Figure 12:
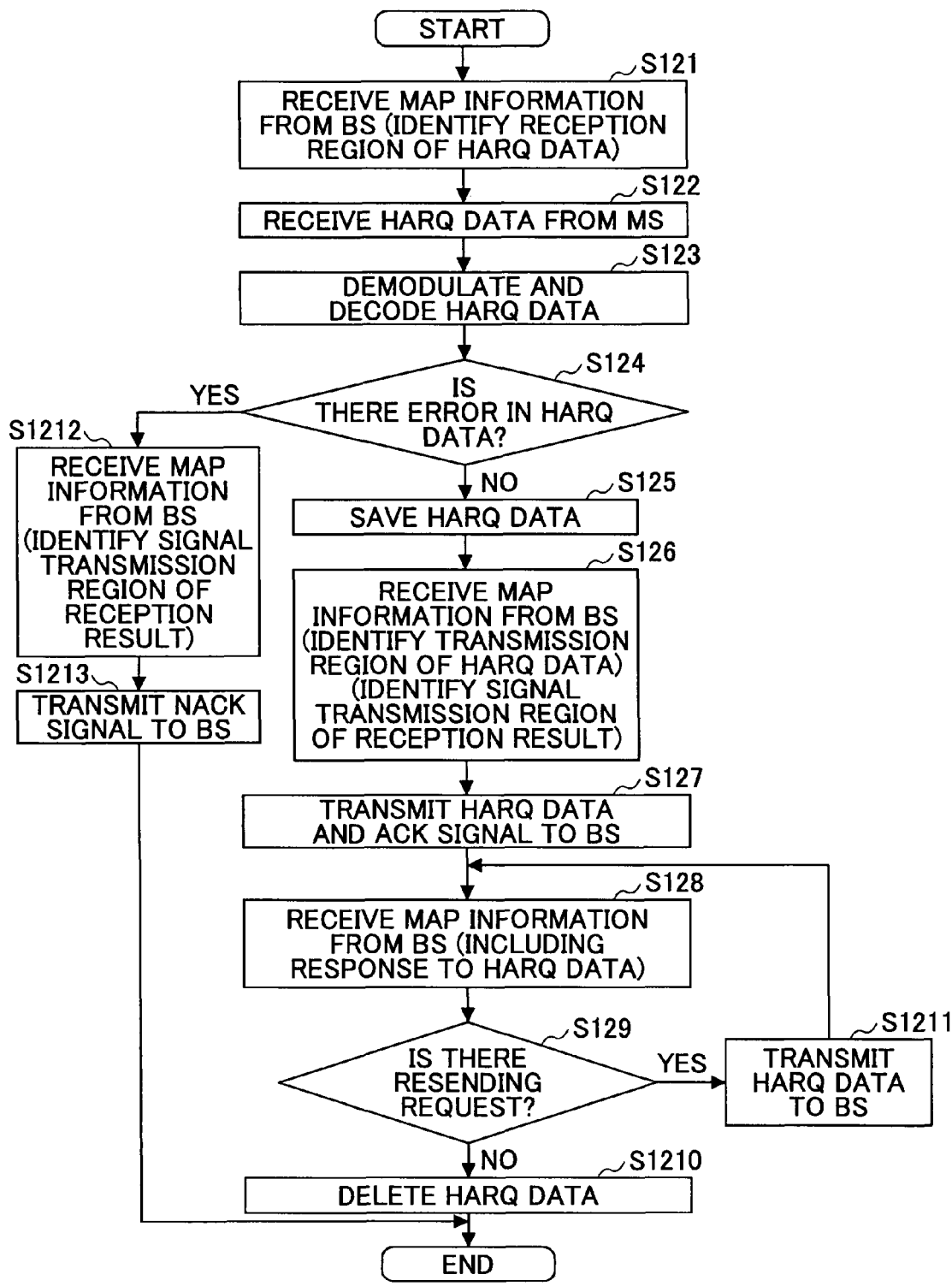
FIG. 12 illustrates an operation flow (part 2) of the RS according to the second embodiment of the present invention.
Figure 13:
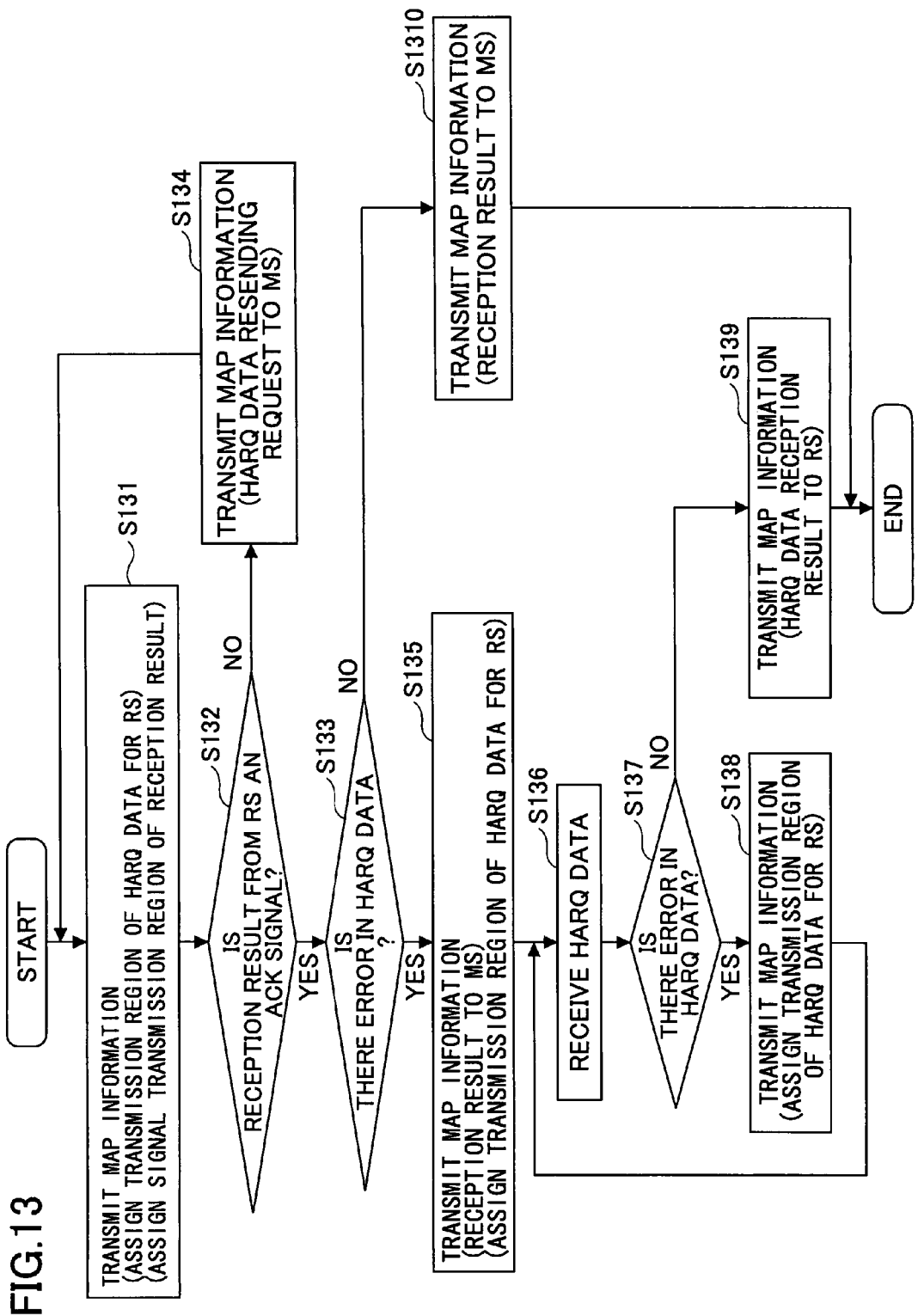
FIG. 13 illustrates an operation flow (part 2) of the BS according to the second embodiment of the present invention.

FIGS. 12 and 13 illustrate operation flows (part 2) of the RS and the BS, respectively.

Figure 14:
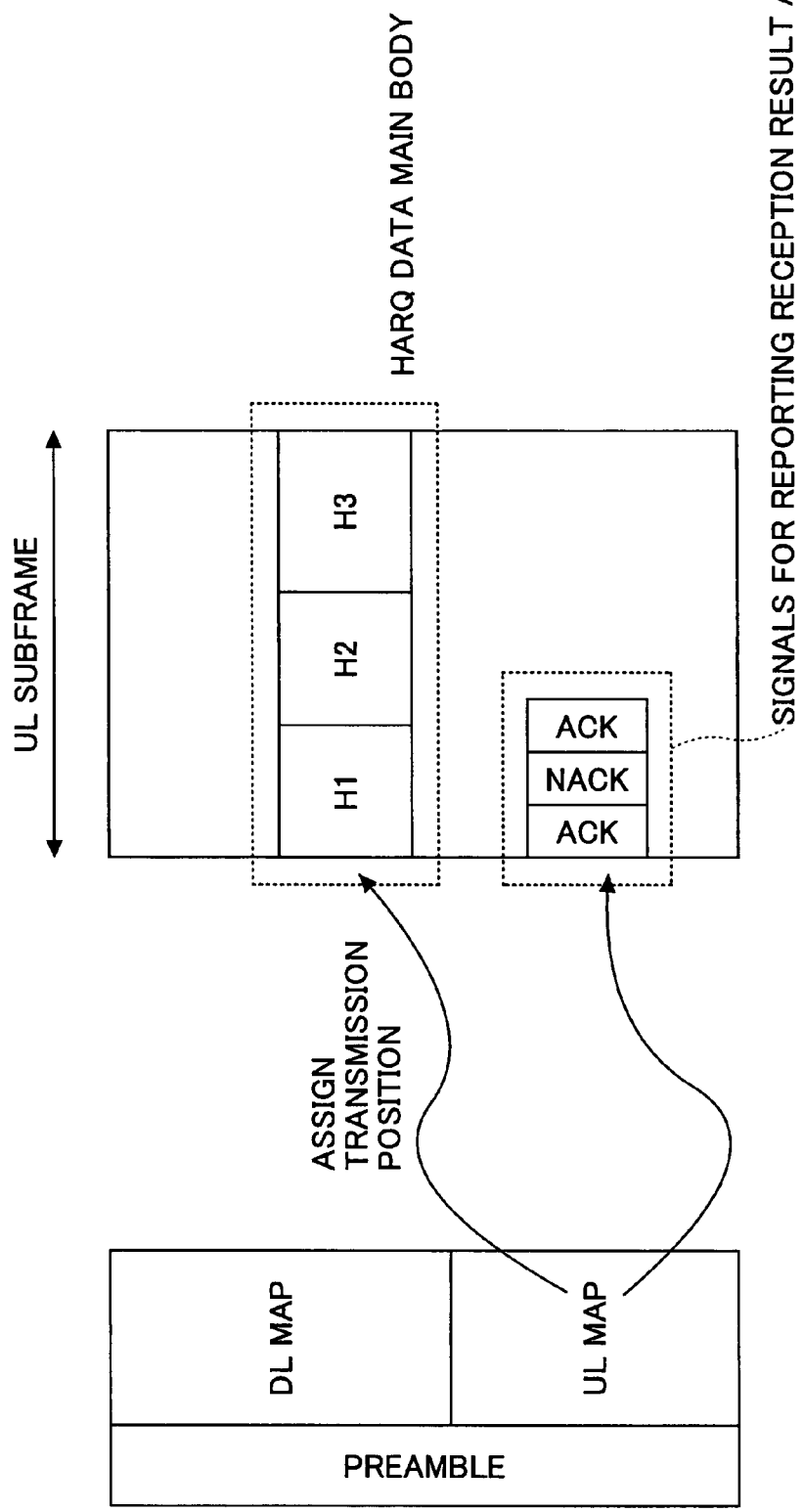
FIG. 14 illustrates a configuration of MAP data according to the second embodiment of the present invention.

FIG. 14 illustrates a configuration of MAP data.

In this modification, a reception result of HARQ data sent from the MS and received by the RS (e.g., whether the data has been properly received or has not been properly received) is sent to the BS.

For example, when the reception result of HARQ data from the MS received by the RS indicates that the data has been properly received (when an ACK signal is received), but the BS detects an error in the HARQ data received from the RS, the BS transmits a resending request to the RS but not to the MS (see FIG. 10). The resending request can be sent to the RS by the same method as described above.

On the other hand, if the RS does not properly receive the HARQ data, the HARQ data will not be sent to the BS, but a reception result (NACK signal) indicating that the HARQ data has not been properly received by the RS will be sent to the BS (see FIG. 11). The HARQ data with the errors detected at the RS can be sent to the BS, so that the BS can combine this data with resent data.

When the NACK signal is received, the BS does not transmit a resending request to the RS, but transmits a resending request to the MS. Then, the BS assigns a transmission region for the RS, and receives HARQ data resent from the MS. Preferably, the BS combines the HARQ data previously received from the RS with the HARQ data that is resent.

FIG. 14 illustrates an example of MAP data created by the MAP information generating unit 9 of the BS in order to receive HARQ data and an ACK signal or a NACK signal from the RS.

As shown in FIG. 14, the BS creates UL-MAP data, which not only defines a transmission region for transmitting the HARQ data itself, but also a transmission region for an ACK signal/a NACK signal.

For example, plural (three) transmission regions are defined for the HARQ data, and plural (three) corresponding transmission regions are defined for corresponding ACK signals/NACK signals. When transmitting HARQ data in H1, the RS saves an ACK signal/a NACK signal in the transmission region corresponding to H1 (an ACK signal in the example shown in FIG. 14). The defined regions are assigned for the RS by using a connection ID of the RS.

FIG. 12 is a flowchart of a process performed by the RS.

The RS recognizes that HARQ data will be transmitted by the MS according to UL-MAP data transmitted from the BS, and identifies the reception region (step S121).

The RS receives the HARQ data transmitted from the MS in the identified reception region (step S122), and demodulates and decodes the received HARQ data (step S123).

The RS performs an error detection process on the decoded HARQ data (step S124), and if an error is detected, the RS identifies a transmission region for the NACK signal from the UL-MAP data (step S1212).

Then, the RS transmits, to the BS, a NACK signal indicating that the HARQ data has not been properly received from the MS (step S1213). The HARQ data from the MS before being decoded is preferably saved in the storage unit of the reception process unit. When data resent from the MS is received, the resent data is combined with the saved HARQ data, and is then decoded. The RS can identify a transmission region of HARQ data according to the UL-MAP data received from the BS, and transmit to the BS, in the identified region, the HARQ data that has not been properly received. Accordingly, it is possible to efficiently make use of the assigned transmission region and to enable a HARQ process in the BS (combine with resent data).

On the other hand, if no errors are detected in the HARQ data, the RS saves the HARQ data in the PDU buffer unit 28 (step S125). This is to be prepared to resend the HARQ data to the BS.

The RS identifies a transmission region for the HARQ data and a transmission region for the ACK signal according to the UL-MAP data (step S126). It is also possible to not transmit an ACK signal.

The RS transmits, to the BS, the HARQ data received from the MS and the ACK signal, in the assigned transmission region (step S127).

The RS receives, from the BS, MAP data addressed to the RS or data saved in the transmission region defined by the MAP data (step S128).

When the RS detects, from the received data, a resending request as reception result information from the BS (step S129), the RS reads the HARQ data saved in the PDU buffer unit 28, and resends the HARQ data to the BS through the transmission region defined in the received MAP data (step S1211). The assigned transmission region and the resending request from the BS can be saved in the MAP data; however, it is also possible to save the resending request in a data transmission region separately defined by DL-MAP data.

On the other hand, when the RS does not detect a resending request (or when it is detected (reported) that the data has not been properly received by the BS), the RS deletes the HARQ data saved in the PDU buffer unit 28 (step S1210), and the process ends.

FIG. 13 is a flowchart of a process performed by the BS.

The BS transmits, to the MS, UL-MAP data assigning a transmission region of HARQ data, and then transmits, to the RS, MAP data (see FIG. 14) defining a transmission region of HARQ data and a transmission region of an ACK/NACK signal so that the RS can transmit HARQ data to the BS (step S131). Then, the BS performs receiving operations in the defined transmission regions.

Based on the received contents, the BS determines whether the RS has properly received the HARQ data (step S132). For example, the BS can make this determination based on whether an ACK signal has been received or whether HARQ data has been saved.

If the BS determines that the RS has not properly received the HARQ data, the BS will transmit, to the MS, UL-MAP data assigning a data transmission region for resending the HARQ data (step S134), and the process returns to step S131.

If the BS determines that the RS has properly received the HARQ data (if an ACK signal is received), the BS receives the HARQ data, and performs a decoding process and an error detection process on the HARQ data (step S133).

If no errors are detected, the BS transmits a signal to the MS indicating that the HARQ data has been properly received (step S1310). For example, the BS transmits an ACK signal by saving it in MAP data or in a transmission region defined by DL-MAP data. Incidentally, the BS can also transmit the ACK signal to the RS in the same manner.

If the BS detects an error from the decoded HARQ data, the BS transmits a signal to the MS indicating that the HARQ data has been properly received and transmits a resending request to the RS (step S135). The BS can save, in MAP data, an ACK signal for the MS and a resending request signal (NACK signal, etc.) for the RS. The BS assigns a data transmission region for the RS with the use of UL-MAP data, so that the RS can resend the HARQ data received from the MS. Furthermore, the BS saves the received HARQ data before being decoded in the storage unit of the reception process unit.

When the BS receives the HARQ data resent from the RS (step S136), the BS combines the received HARQ data with the HARQ data saved in the storage unit, decodes the combined data, and performs an error detection process on the decoded data (step S137).

If no errors are detected, the BS transmits to the RS, a signal (e.g., an ACK signal) indicating that the HARQ data has been properly received. The ACK signal can be saved in MAP data or in a data transmission region addressed to the MS defined in DL-MAP data.

If an error is detected as a result of the error detection, the BS transmits a request to the RS to resend the HARQ data (step S138), and the process returns to the step of receiving the next resent HARQ data (step S136).

The resending request to the RS can be performed in the same manner as the resending request to the RS performed in step S135. The BS saves the received HARQ data before being decoded (the combined HARQ data if it has already been combined once) in the storage unit of the reception process unit. When the resent HARQ data is received from the RS, the BS combines the received HARQ data with the HARQ data saved in the storage unit, and then decodes the combined data.

[c] Description of Third Embodiment

Next, descriptions are given of downlink data transmission.

"Downlink data transmission (part 1)"

Figure 15:
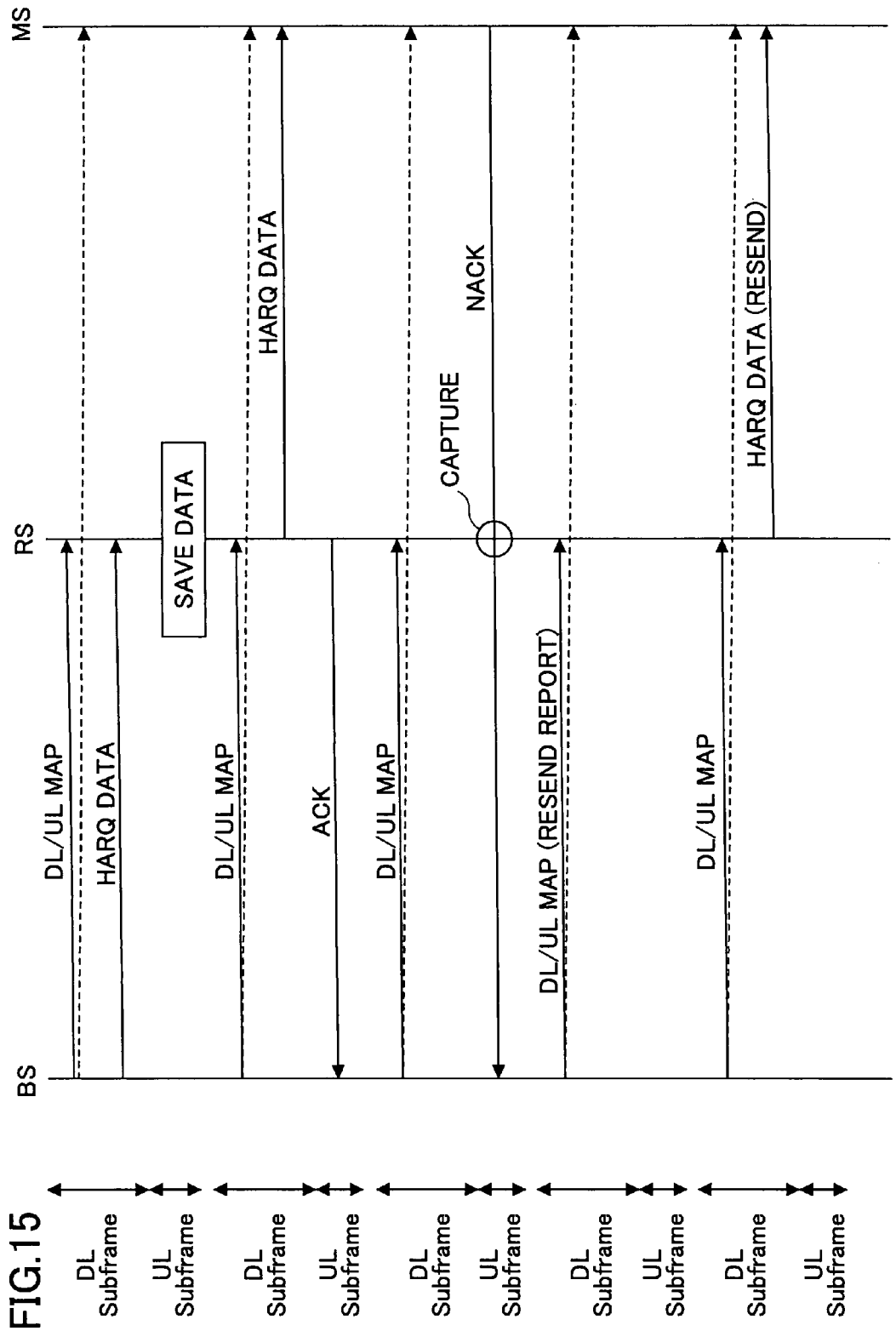
FIG. 15 is a sequence diagram of downlink data transmission (part 1) according to a third embodiment of the present invention.
Figure 16:
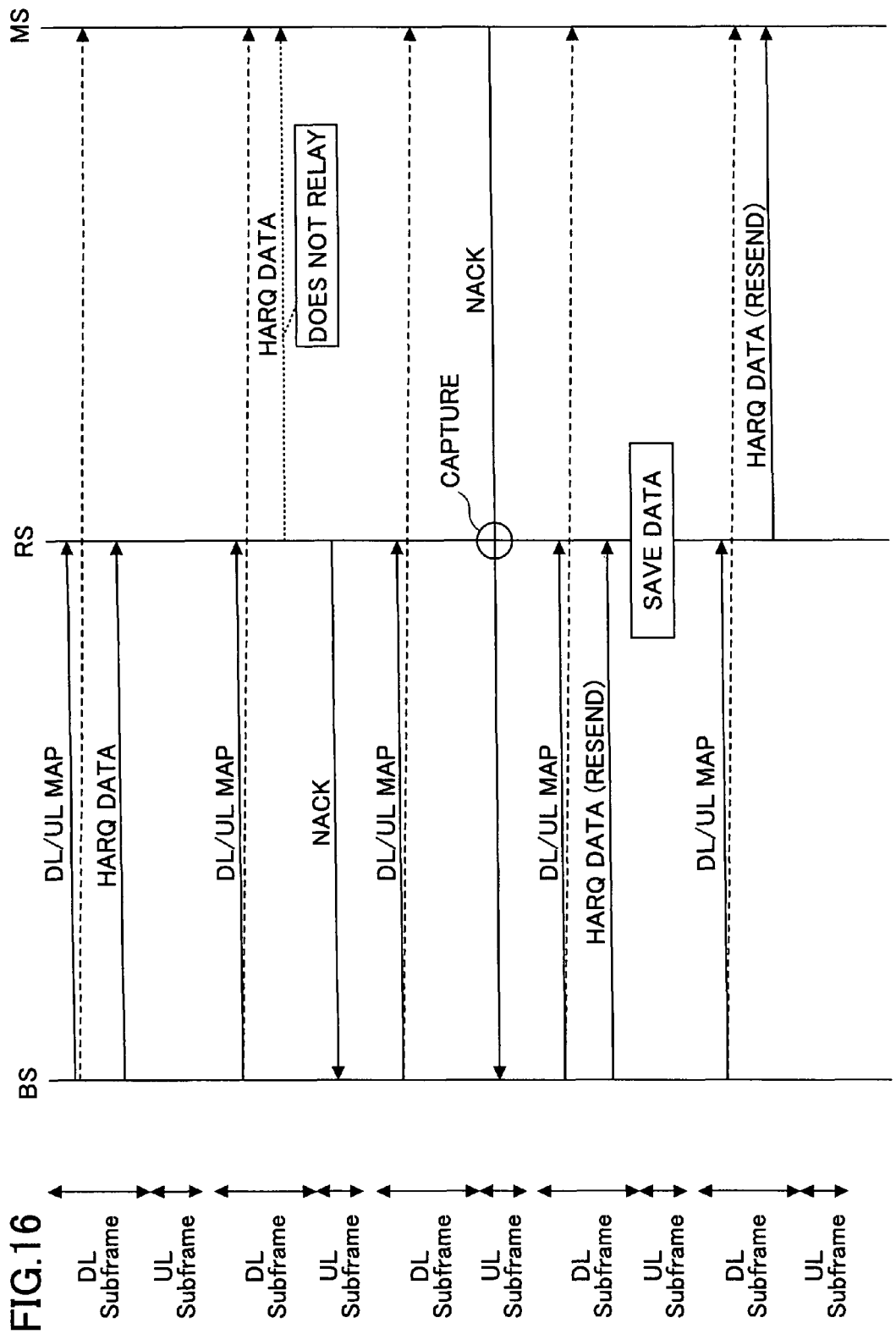
FIG. 16 is a sequence diagram of downlink data transmission (part 1) according to the third embodiment of the present invention.

FIGS. 15 and 16 are sequence diagrams of downlink data transmission (part 1).

Figure 17:
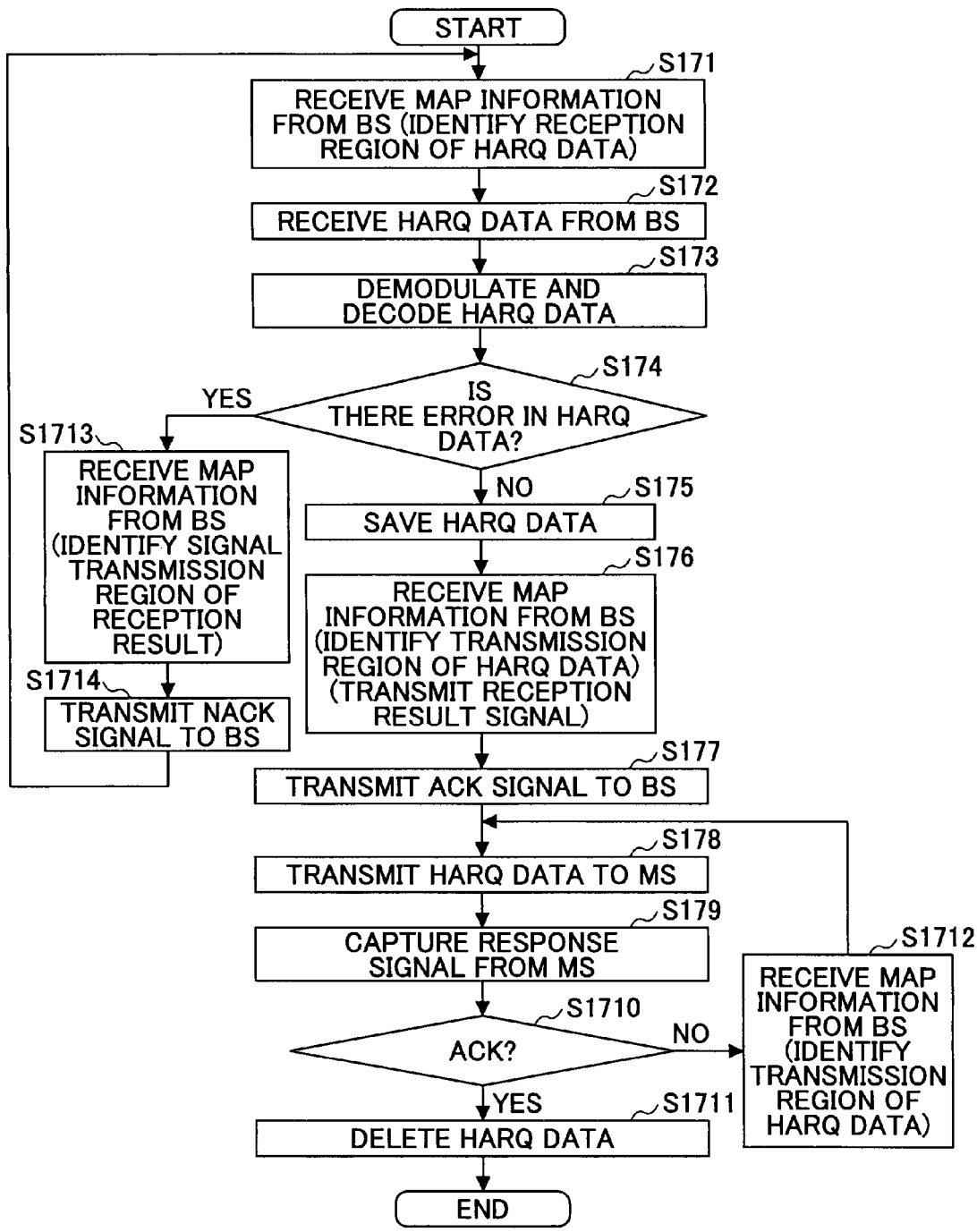
FIG. 17 illustrates an operation flow (part 1) of the RS according to the third embodiment of the present invention.
Figure 18:
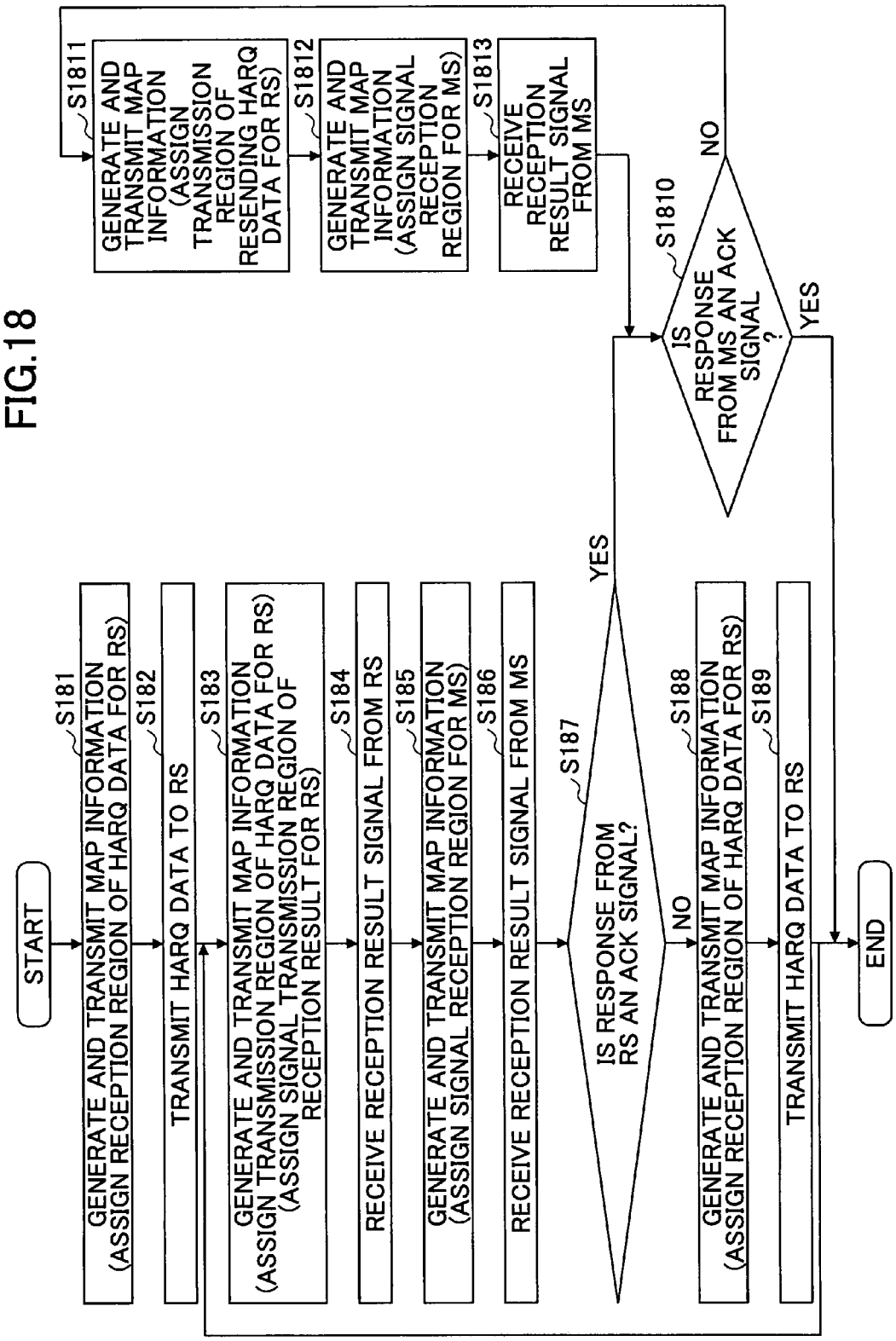
FIG. 18 illustrates an operation flow (part 1) of the BS according to the third embodiment of the present invention.

FIGS. 17 and 18 illustrate operation flows (part 1) of the RS and the BS, respectively.

In this example, HARQ is employed for controlling the resending operation, and data that is the target of HARQ control is referred to as HARQ data. In a case where ARQ control is employed, the received data does not need to be saved for the purpose of combining data.

Referring to FIG. 15, the BS acquires, from the packet buffer unit 12, a preamble, MAP data, and data corresponding to a region defined by the MAP data, which are generated by the MAP information generating unit 9, forms a subframe at the PDU generating unit 13, and transmits the subframe from the transmitting unit 16 via the antenna 1.

The RS and the MS receive the MAP data from the BS, analyze the DL-MAP data and the UL-MAP data at their respective MAP information analyzing units 26, and recognize the transmission/reception region pertinent to them. This can be determined by using an assigned connection ID.

In this case, a transmission region is assigned for the RS by the DL-MAP data to transmit HARQ data (i.e., a reception region to receive the HARQ data, from the viewpoint of the RS). Accordingly, the RS controls the reception process unit to receive the HARQ data in the assigned reception region.

When the RS receives the HARQ data from the BS, the decoding unit 24 decodes the received data, performs an error detection process on the received data by using error detection codes (e.g., CRC bit), and provides the results to the control unit 27.

If no errors are detected, in the RS, the decoded HARQ data is provided to the PDU buffer unit 28 via the control data extracting unit 25.

Next, in the BS, the MAP information generating unit 9 creates DL-MAP data defining a transmission region to the MS, so that the RS can transmit HARQ data to the MS.

In both the RS and the MS, the MAP information analyzing unit 26 receives MAP data from the BS (particularly DL-MAP data), and detects that the transmission region to the MS has been reserved.

Accordingly, the RS encodes the HARQ data received from the BS and saved in the PDU buffer unit 28, and then transmits the encoded HARQ data in the assigned transmission region from the transmitting unit 31. Even after the HARQ data has been transmitted, the PDU buffer unit 28 holds the transmitted HARQ data, to be prepared for a resending operation to the MS.

The MAP information analyzing unit 26 of the RS detects from the MAP data received from the BS that the transmission region for transmitting a reception result has been assigned by the UL-MAP data. Hence, the RS transmits to the BS, in the assigned transmission region, a signal (e.g., an ACK signal) indicating that the HARQ data has been properly received. It is also possible to report that the HARQ data has been properly received by not transmitting a signal (e.g., a NACK signal) indicating that the HARQ data has not been properly received.

The control unit 27 of the MS controls the reception process unit to perform a receiving operation in the reception region corresponding to the transmission region detected by the MAP information analyzing unit 26, to receive the HARQ data transferred from the RS.

When the HARQ data is received from the RS, in the MS, the decoding unit 24 decodes the received HARQ data and performs an error detection process on the decoded data.

If no errors are detected, the MS will transmit, to the BS, an ACK signal indicating that the HARQ data has been properly received (not shown). If an error is detected, the MS will transmit to the BS, a NACK signal indicating that the HARQ data has not been properly received (as shown in FIG. 15). The ACK signal or the NACK signal is transmitted in the data transmission region (transmission region assigned to the MS) defined by the UL-MAP data transmitted from the BS.

The BS first receives an ACK signal from the RS (does not receive a NACK signal), and then receives a NACK signal from the MS. Therefore, the BS recognizes that the HARQ data has been successfully transmitted to the RS, but the HARQ data has not been successfully transmitted from the RS to the MS.

Accordingly, the MAP information generating unit 9 of the BS creates MAP data defining a transmission region to the MS with DL-MAP data, and transmits the MAP data. Preferably, a signal indicating a resending request to the RS is also transmitted. The resending request signal can be saved in the DL-MAP data defining the transmission region. The resending request signal can also be transmitted to the RS via an MMR link as a separate message to the RS (saved in downlink burst data to the RS). When the MS transmits the reception result to the BS, the RS can also receive that signal and recognize the reception result at the MS. By receiving this signal, the control unit 27 of the RS recognizes that the HARQ data needs to be resent from the RS to the MS. By receiving the DL-MAP data assigning the transmission region to the MS, the RS can resend the HARQ data to the MS.

When the MAP data defining the transmission region to the MS is received (preferably, a resending request signal is also received), the control unit 27 of the RS reads the transmitted HARQ data saved in the PDU buffer unit 28, and provides it to the encoding unit 29 in order to resend it in the assigned transmission region.

After transmitting the NACK signal, the control unit 27 of the MS receives DL-MAP data and recognizes that the HARQ data will be resent to the MS. Therefore, the control unit 27 controls the reception process unit for receiving signals to be transmitted in the assigned transmission region.

When the resent HARQ data is received, the MS reads the HARQ data previously received and saved in the storage unit of the reception process unit, combines the read HARQ data with the resent HARQ data, decodes the combined data in the decoding unit 24, and performs an error detection process on the decoded data.

The error detection result is reported to the control unit 27. According to the received result, an ACK signal (no errors detected) or a NACK signal (an error is detected) is generated. The generated signal is transmitted to the BS in the assigned transmission region. In FIG. 15, the signal is directly transmitted to the BS; however, the signal can be transmitted to the BS via the RS. In the latter case, a transmission region for transferring the signal from the RS to the BS needs to be defined in the UL-MAP data.

If an ACK signal is returned, the BS will determine that transmission of the HARQ data has been completed, and ends the process. If a NACK signal is returned, the BS will perform the above-described process for causing the RS to resend the HARQ data to the MS.

FIG. 16 is a sequence diagram of a process performed when an error is detected in the HARQ data received by the RS from the BS.

In this case, the decoding unit 24 of the RS detects an error in the received HARQ data after being decoded. Therefore, the decoding unit 24 transmits a report to the control unit 27 that an error has been detected, and saves the received HARQ data before being decoded in the storage unit of the reception process unit (to be combined with data to be resent).

In the BS that has transmitted the HARQ data to the RS, the MAP information generating unit 9 creates DL-MAP data defining a transmission region to the MS, so that the RS can transmit data to the MS. The created DL-MAP data is transmitted from the transmitting unit 16.

However, the control unit 27 of the RS has detected an error in the HARQ data received from the BS, and thus does not transmit the HARQ data to the MS in the transmission defined in the DL-MAP data from the BS.

Meanwhile, the RS detects from the UL-MAP data from the BS, with the MAP information analyzing unit 26, that a transmission region has been assigned for transmitting a result as to whether the data has been properly received. The RS controls the transmission process unit to transmit the reception result in the assigned transmission region.

The RS transmits a NACK signal.

The BS assigns a transmission region for the MS to transmit a result as to whether the data has been properly received. That is, the transmission region is assigned for the MS with the UL-MAP data.

The MAP information analyzing unit 26 of the MS analyzes the UL-MAP data and detects the transmission region. The control unit 27 of the MS creates a signal indicating a reception result (in this case, the MS has not received the HARQ data, and thus creates a NACK signal), and controls the transmission process unit to transmit the created signal in the assigned transmission region.

The RS preferably receives the NACK signal transmitted from the MS in the transmission region assigned by the BS, and recognizes that a resending operation will be controlled for resending the HARQ data to the MS originating from the BS.

The BS receives the NACK signal from the RS and recognizes that it is necessary to resend the HARQ data to the RS. The BS defines, with DL-MAP data, a transmission region to the RS for the resending operation, transmits the DL-MAP data, and resends the HARQ data in the transmission region. Specifically, the BS reads the HARQ data saved in the packet buffer unit 12, and resends the read HARQ data to the RS.

The RS recognizes that HARQ data will be resent based on the DL-MAP data, and controls the reception process unit to perform a reception process.

The RS combines the resent HARQ data with the HARQ data saved in the storage unit of the reception process unit, decodes the combined data, and performs an error detection process on the decoded data. Subsequent processes are similar to those of the above description.

FIG. 17 is a flowchart of a process performed by the RS.

The RS recognizes that HARQ data will be transmitted from the BS according to DL-MAP data transmitted from the BS, and identifies the reception region (step S171).

The RS receives the HARQ data transmitted from the BS in the identified reception region (step S172), and demodulates and decodes the received HARQ data (step S173).

The RS performs an error detection process on the decoded HARQ data (step S174), and if an error is detected, the RS receives UL-MAP data transmitted from the BS, detects a transmission region to transmit a signal for reporting a reception result (step S1713), and transmits, to the BS, a signal (NACK signal) indicating that the HARQ data has not been properly received (step S1714). The RS saves the received HARQ data before being decoded in the storage unit of the reception process unit. This is to be prepared for combining the saved HARQ data with HARQ data to be resent from the BS.

Then, the process returns to step S171. The RS receives DL-MAP data and resent HARQ data from the BS, combines the resent HARQ data with the HARQ data saved in the storage unit of the reception process unit, and performs an error detection on the combined HARQ data once again (step S174).

On the other hand, if no errors are detected, the process proceeds to step S175.

In step S175, the RS performs a process to save the HARQ data received from the BS in the PDU buffer unit 28.

Then, the RS receives DL-MAP data from the BS, identifies a transmission region for the HARQ data, receives UL-MAP data from the BS, and identifies a transmission region for reporting a reception result (step S176).

The RS transmits an ACK signal to the BS in the identified transmission region for reporting the reception result (step S177).

The RS transmits the HARQ data to the MS in the identified transmission region for the HARQ data (step S178).

Then, the RS detects from the UL-MAP data from the BS that a transmission region for reporting a reception result has been assigned to the MS, and thus attempts to receive a signal transmitted from the MS in the transmission region (step S179).

The RS determines whether the received signal is an ACK signal (step S1710). If an ACK signal is detected, there is no need to resend the HARQ data, and therefore, the RS will delete the transmitted HARQ data saved in the storage unit of the transmission process unit (step S1711), and the process ends.

On the other hand, if a NACK signal is detected, the RS will recognize that it is necessary to resend the HARQ data, and will also recognize that a transmission region for transmitting data to the MS has been assigned by the DL-MAP data transmitted from the BS (step S1712). The RS resends the HARQ data in the assigned transmission region (step S178). Subsequent processes are similar to those of the above description.

In this example, the RS monitors signals indicating reception results transmitted from the MS; however, the RS can receive, from the BS, a reception result at the MS. The RS can also determine that the MS has properly received the data when a resending request is not received from the BS.

However, by monitoring signals from the MS, the RS can quickly recognize a reception result, and can thus quickly delete unnecessary data. Furthermore, it will be possible to reduce the amount of signals to be transmitted in wireless transmission, and wireless resources can thus be conserved.

FIG. 18 is a flowchart of a process performed by the BS.

In order to report that the BS will transmit HARQ data to the RS, the BS creates DL-MAP data defining a transmission region of the HARQ data, and transmits the created DL-MAP data to the RS (step S181). Then, the BS transmits the HARQ data in the transmission region defined by the DL-MAP data (step S182).

The transmitted HARQ data is saved in the storage unit of the transmission process unit of the BS. This is to be prepared to resend the HARQ data to the RS.

Next, the BS defines, in DL-MAP data, a transmission region for the MS, so that the RS can transmit HARQ data to the MS (step S183). The BS also defines, in UL-MAP data, a transmission region for transmitting data to the BS, so that the RS can report to the BS a reception result of the HARQ data (step S183).

The BS receives a report of the reception result transmitted from the RS in the assigned transmission region (step S184).

Next, the BS defines, in UL-MAP data, a transmission region for the MS, so that the MS can report, to the RS, a reception result of the HARQ data (step S185).

Then, the BS receives a signal indicating a reception result from the MS (step S186).

Next, the BS determines whether the response from the RS is an ACK signal (step S187). If the response is not an ACK signal (if the response is a NACK signal), the BS will define, in DL-MAP data, a transmission region for resending HARQ data to the RS, and the BS will transmit the DL-MAP data (step S188).

The BS resends the HARQ data in the defined transmission region (step S189), and the process returns to step S183.

On the other hand, if the response from the RS is an ACK signal, the BS will determine whether the response from the MS is an ACK signal (step S1810). If the response from the MS is an ACK signal, the BS recognizes that the HARQ data has been successfully transmitted to the MS, and the process ends.

On the other hand, if the response from the MS is not an ACK signal (if the response is a NACK signal), the RS will resend the HARQ data to the MS.

That is, the BS will transmit DL-MAP data defining a transmission region to the MS (step S1811).

The BS will create UL-MAP data defining a transmission region for the MS to transmit a reception result, and transmit the created UL-MAP data (step S1812).

The BS receives a reception result from the MS in the assigned transmission region (step S1813), and determines whether the response from the MS is an ACK signal (step S1810).

Subsequent processes are similar to those of the above description.

"Downlink data transmission (part 2)"

Next, a modification of the downlink data transmission (part 2) is described.

Figure 19:
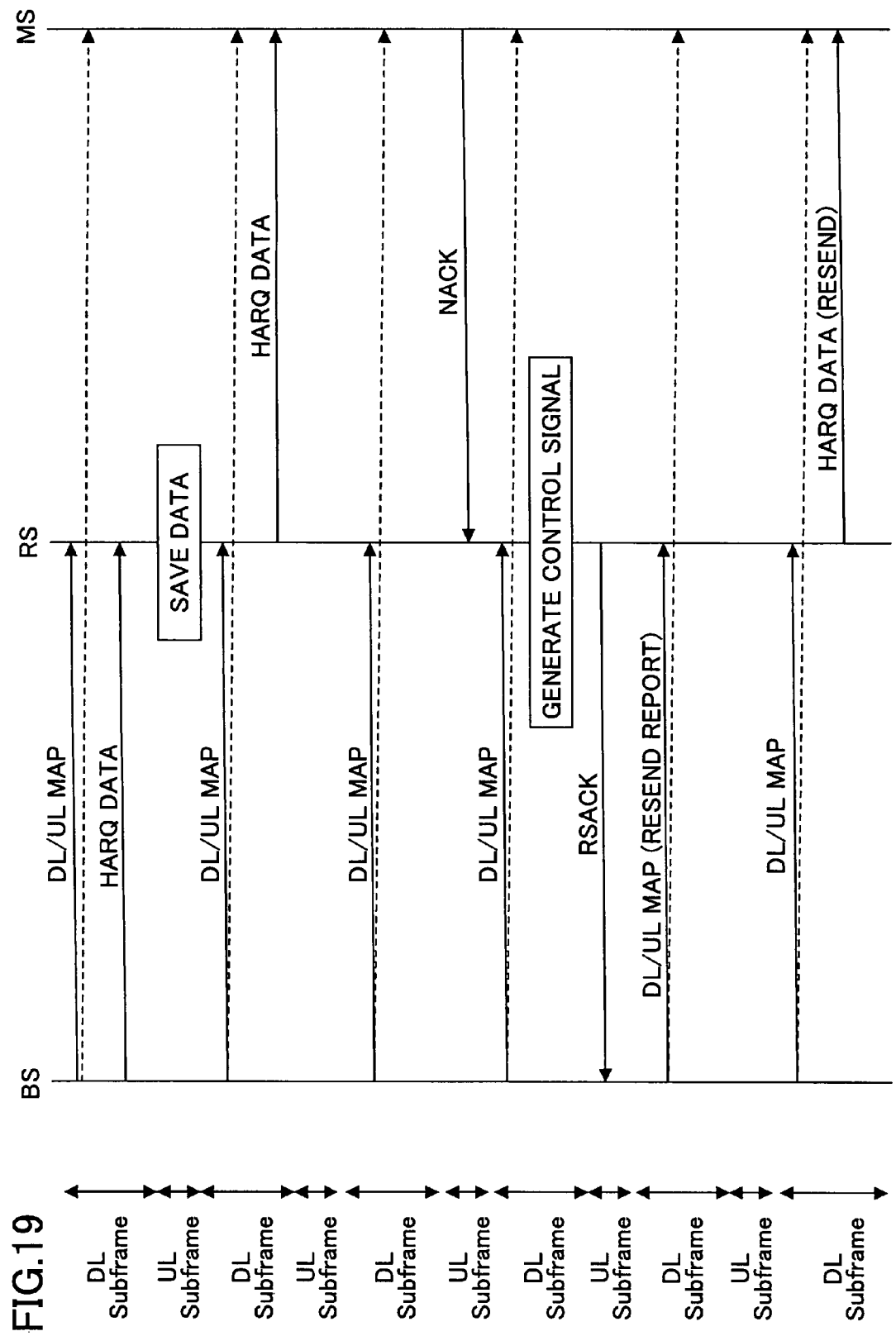
FIG. 19 is a sequence diagram of downlink data transmission (part 2) according to the third embodiment of the present invention.
Figure 20:
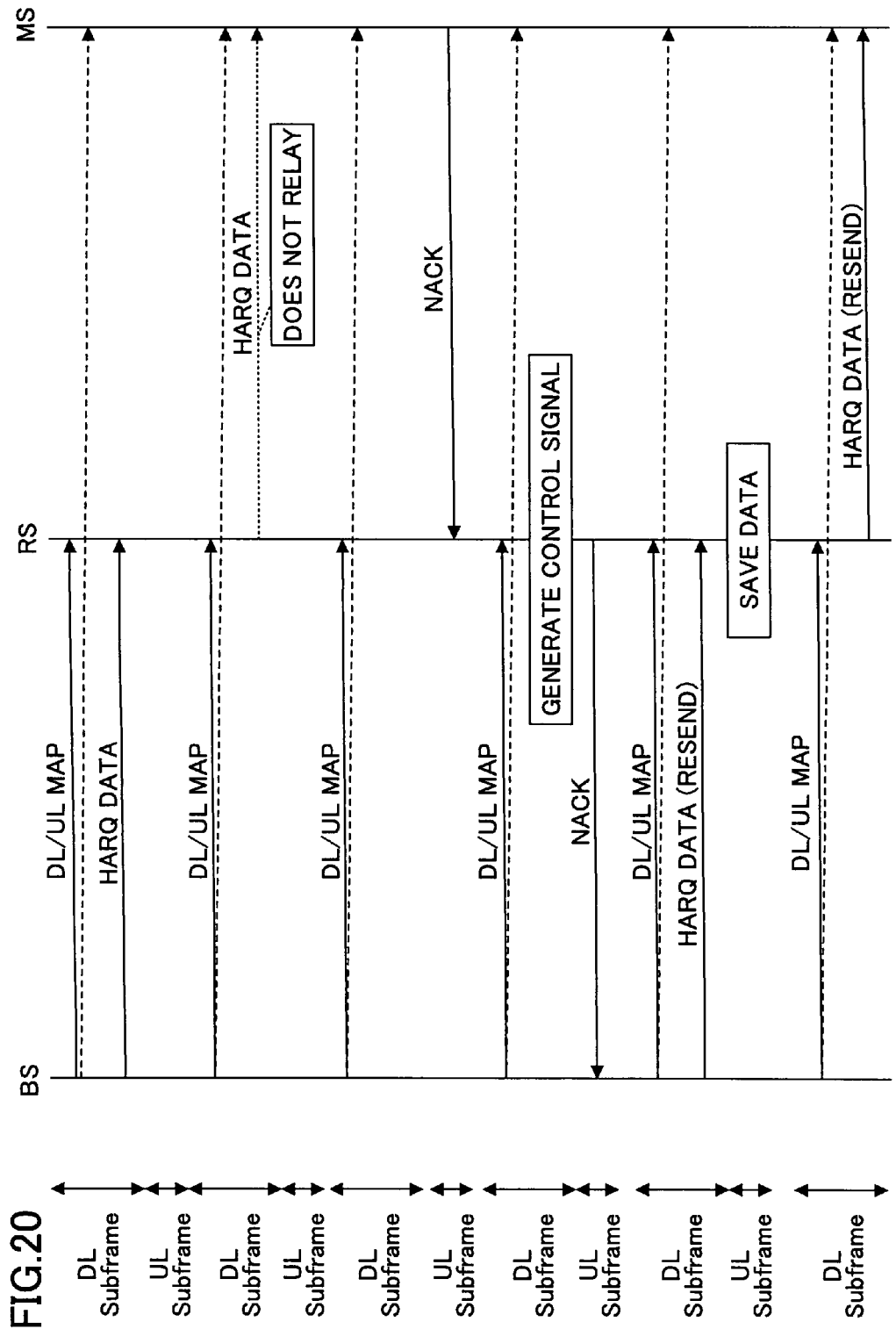
FIG. 20 is a sequence diagram of downlink data transmission (part 2) according to the third embodiment of the present invention.

FIGS. 19 and 20 are sequence diagrams of downlink data transmission (part 2).

Figure 21:
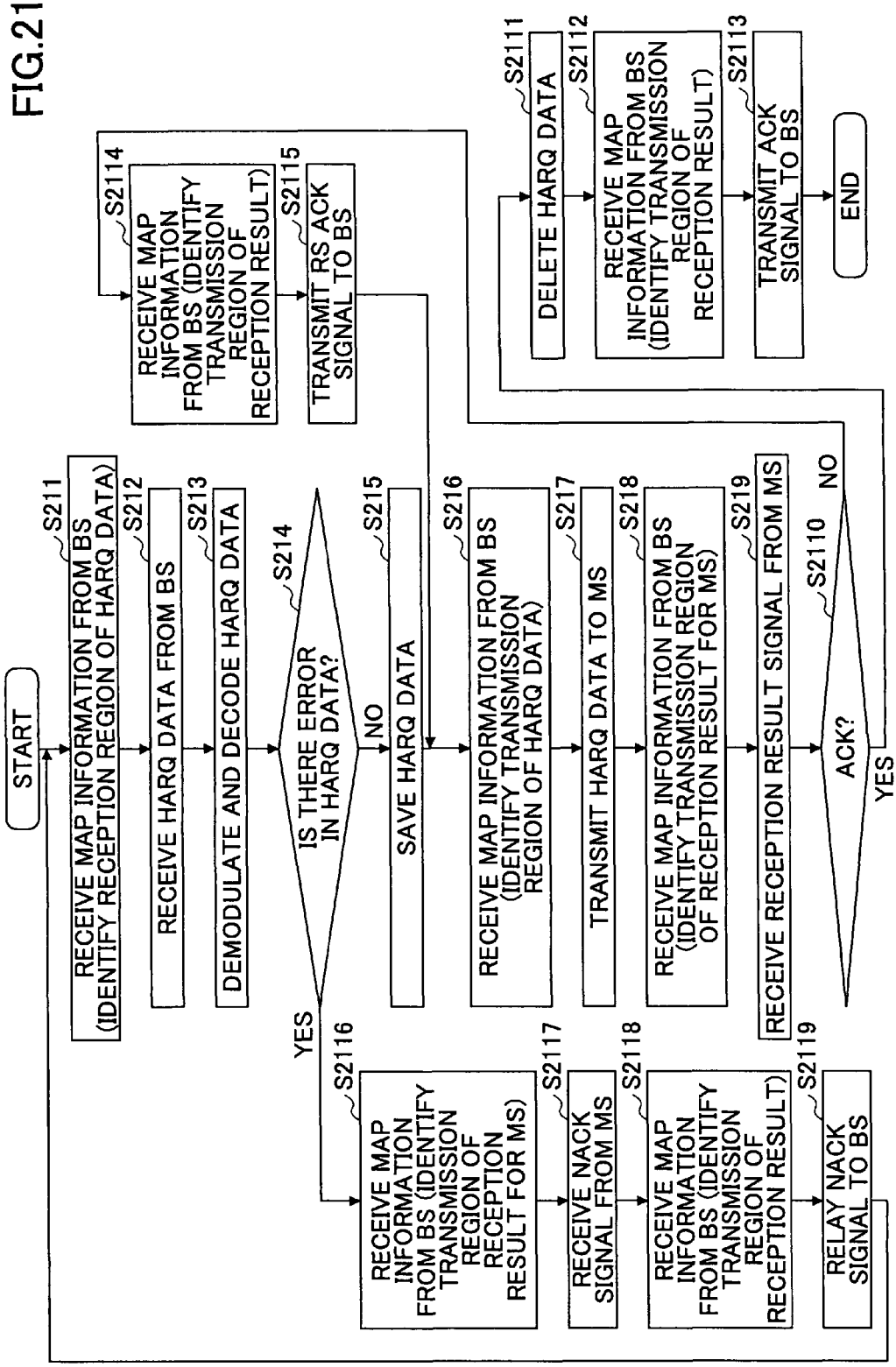
FIG. 21 illustrates an operation flow (part 2) of the RS according to the third embodiment of the present invention.
Figure 22:
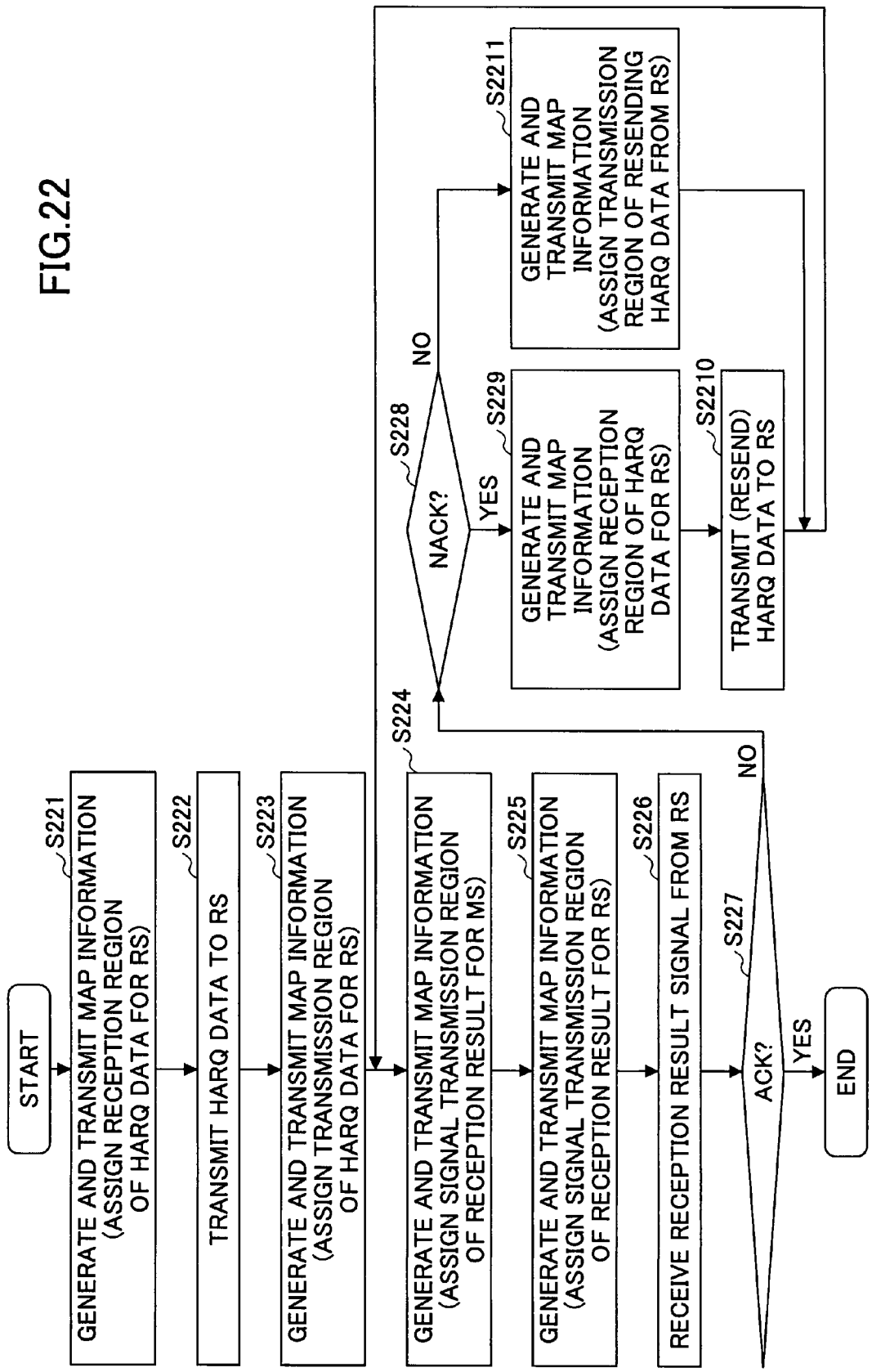
FIG. 22 illustrates an operation flow (part 2) of the BS according to the third embodiment of the present invention.

FIGS. 21 and 22 illustrate operation flows (part 2) of the RS and the BS, respectively.

FIG. 23 illustrates signals and their meanings.

In this modification, a signal indicating a reception result from the MS is transmitted from the RS to the BS. Preferably, the RS transmits, to the BS, the reception result at itself (at the RS) together with the reception result received from the MS.

That is, in the sequence shown in FIG. 15, after transmitting HARQ data to the RS, the BS transmits to the RS, UL-MAP data defining a transmission region for reporting a reception result. However, in the present modification, such a transmission region does not need to be defined at that stage.

Accordingly, the ACK signal transmitted from the RS in the sequence shown in FIG. 15 is not transmitted from the RS to the BS at the same stage in the sequence shown in FIG. 19. Moreover, the NACK signal transmitted from the RS in the sequence shown in FIG. 16 is not transmitted from the RS to the BS at the same stage in the sequence shown in FIG. 20.

In the sequences shown in FIGS. 15 and 16, the BS transmits, to the MS, UL-MAP data defining a transmission region for reporting a reception result, and therefore, the BS receives a reception result from the MS.

However, in this modification, the BS does not need to receive a reception result from the MS at the same stage as that in the sequences shown in FIGS. 15 and 16. As a matter of course, the BS can be configured to receive a reception result from the MS in that stage.

The MAP information generating unit 9 of the BS creates and transmits UL-MAP data defining a transmission region for the RS to transmit, to the BS, the reception result at itself (at the RS) together with the reception result received from the MS.

Accordingly, the RS transmits, in the assigned transmission region, a reception result regarding HARQ data previously received from the BS together with a reception result received from the MS regarding HARQ data.

FIG. 23 illustrates examples of signals transmitted by the RS. When the MS properly receives HARQ data, the RS creates and transmits to the BS, an ACK signal indicating that HARQ data has been successfully transmitted. When an error is detected in the HARQ data at the point where the RS receives the HARQ data from the BS, the RS creates and transmits to the BS, a NACK signal. When the RS properly receives the HARQ data but the MS detects an error from the HARQ data, the RS creates and transmits to the BS, an RSACK signal. Signals other than these can be used as long as the BS can determine which one of these three reception statuses is detected.

In the sequence shown in FIG. 19, the RS transmits an RSACK signal to the BS, and in the sequence shown in FIG. 20, the RS transmits a NACK signal to the BS.

The control unit 8 of the BS determines, according to a signal received from the RS, whether the HARQ data needs to be resent from the BS (if a NACK signal is received), or whether the HARQ data needs to be resent from the RS (if an RSACK signal is received), and performs a process according to the determination result.

In the sequence shown in FIG. 19, the HARQ data needs to be resent from the RS, and therefore, the BS creates and transmits DL-MAP data defining a transmission region to the MS, and the RS resends the HARQ data in the transmission region.

In the sequence shown in FIG. 20, the HARQ data needs to be resent from the BS, and therefore, the BS creates DL-MAP data defining a transmission region to the RS, and resends the HARQ data to the RS in the corresponding transmission region. Subsequently, the BS creates DL-MAP data defining a transmission region to the MS, and the RS resends the HARQ data in the corresponding transmission region.

FIG. 21 is a flowchart of a process performed by the RS.

The RS recognizes that HARQ data will be transmitted from the BS according to DL-MAP data transmitted from the BS, and identifies the reception region (step S211).

The RS receives the HARQ data transmitted from the BS in the identified reception region (step S212), and demodulates and decodes the received HARQ data (step S213).

The RS performs an error detection process on the decoded HARQ data (step S214), and if an error is detected, the RS receives UL-MAP data transmitted from the BS, detects a transmission region to transmit a signal for reporting a reception result of the MS (step S2116), and receives from the MS a signal (NACK signal) indicating that the HARQ data has not been properly received (step S2117). The RS saves the received HARQ data before being decoded in the storage unit of the reception process unit. This is to be prepared for combining the saved HARQ data with HARQ data to be resent from the BS.

The RS receives, from the BS, UL-MAP data defining a transmission region for reporting a reception result of the HARQ data, and identifies the transmission region (step S2118).

The RS has detected an error from the HARQ data received from the BS (if necessary, also redundantly refers to reception of a NACK signal from the MS), and therefore, the RS transmits a NACK signal to the BS in the assigned transmission region (step S2119), the process returns to step S211, and the RS receives the HARQ data resent from the BS. At this point, the RS preferably combines the saved HARQ data with the resent HARQ data, and then decodes the combined data.

If no errors are detected in step S214, the transmitted HARQ data is saved in the PDU buffer unit 28 of the RS (step S215). This is to be prepared for a resending operation.

The RS receives, from the BS, MAP data defining a transmission region to transmit HARQ data to the MS. The RS identifies the transmission region (step S216), and transmits the HARQ data to the MS in the identified transmission region (step S217).

Next, a transmission region for a signal for reporting a reception result is assigned to the MS by UL-MAP data. The RS receives this UL-MAP data (step S218), and receives a signal reporting a reception result transmitted from the MS (step S219).

The RS determines whether the result received form the MS is an ACK signal indicating that the MS has properly received the HARQ data (step S2110).

If the RS detects that the result is an ACK signal, it means that the HARQ data has been successfully transmitted. Therefore, the RS deletes the HARQ data saved in the PDU buffer unit 28 (step S2111).

Then, the RS receives UL-MAP data from the BS, and detects a transmission region for transmitting a reception result from the RS (step S2112).

The RS has received the ACK signal from the MS, and therefore, the RS transmits an ACK signal to the BS as a reception result representing both results (the result at the MS and the result at the RS) (step S2113). No errors are detected from the HARQ data from the BS received by the RS, either.

On the other hand, if an ACK signal has not been received from the MS (a NACK signal has been received), the MS receives MAP data transmitted from the BS, and identifies a transmission region for reporting a reception result to the BS (step S2114).

The RS has not detected an error in the HARQ data received from the BS, but received a NACK signal from the MS. Therefore, the RS transmits an RSACK signal to the BS in the assigned transmission region (step S2115), and the process returns to step S216.

FIG. 22 is a flowchart of a process performed by the BS.

The BS creates DL-MAP data defining a transmission region of the HARQ data, and transmits the created DL-MAP data to the RS (step S221). The BS transmits the HARQ data in the defined transmission region (step S222). The BS saves the transmitted HARQ data in the packet buffer unit 12, to be prepared for a resending operation.

Next, the BS creates and transmits DL-MAP data defining a transmission region for transmitting data to the MS, so that the RS can transmit HARQ data to the MS (step S223).

The BS creates UL-MAP data defining a transmission region of a signal for reporting a reception result for the MS, and transmits the created UL-MAP data to the MS (step S224).

The BS creates UL-MAP data defining a transmission region of a signal for reporting a reception result for the RS, and transmits the created UL-MAP data to the RS (step S225).

The BS receives, from the RS, reception result information representing both the result at the RS and the result at the MS (step S226).

If the BS receives an ACK signal from the RS (Yes at step S227), it means that the HARQ data has been properly transmitted to the MS, and therefore, the HARQ data transmission process ends. At this point, the HARQ data saved in the packet buffer unit 12 for a resending operation can be deleted.

On the other hand, if the BS does not receive an ACK signal from the RS (if a NACK signal or an RSACK signal is received) (No at step S227), the process proceeds to step S228.

At step S228, the BS determines whether a NACK signal has been received. If the BS detects that a NACK signal has not been received (i.e., that a RSACK signal has been received), the BS creates and transmits DL-MAP data defining a transmission region for transmitting data to the MS, so that the RS can resend the HARQ data to the MS (step S2211). The BS preferably transmits a resending request signal to the RS to make a resending request.

If the BS detects that a NACK signal has been received, the BS recognizes that a resending operation is necessary. Therefore, the BS creates and transmits DL-MAP data defining a transmission region for transmitting data from the BS to the MS (step S229). The BS reads the HARQ data saved in the packet buffer unit 12, and resends the read HARQ data to the RS in the specified transmission region (step S2210).

Subsequently, the process returns to step S224, and the HARQ data is resent from the RS to the MS.

An embodiment of the present invention provides a relay station provided between a radio base station and a radio terminal for relaying a radio signal, the relay station including a receiving unit configured to receive data transmitted from the radio base station or the radio terminal; a storage unit configured to hold the data; and a transmitting unit configured to relay the data to the radio terminal or the radio base station, and resend the data originating from the relay station in the event that the data need to be resent.

Additionally, an embodiment of the present invention provides a relay station provided between a radio base station and a radio terminal for relaying a radio signal, the relay station including a receiving unit configured to receive data transmitted from the radio base station or the radio terminal; and a reporting unit configured to report, to the radio base station, a reception result of the data.

Preferably, the reporting of the reception result is achieved by not transmitting the received data to the radio base station or by transmitting the reception result as data to the radio base station.

Preferably, the relay station further includes a transmitting unit configured to transmit the data to the radio terminal in the event that the receiving unit receives the data from the radio base station, and to transmit, to the radio base station, the data received by the receiving unit from the radio terminal.

Preferably, the transmitting unit transmits, to the radio base station, the reception result of the data received by the relay station together with the reception result received from the radio terminal.

Additionally, an embodiment of the present invention provides a radio base station for performing radio communication with a radio terminal via a relay station, the radio base station including a creating unit configured to create transmission control data defining a data transmission region for the radio terminal and a data transmission region for the radio base station in the event that the relay station receives data transmitted from the radio base station or from the radio terminal and the data is to be resent originating from the relay station; and a transmitting unit configured to transmit the transmission control data.

Additionally, an embodiment of the present invention provides a radio base station for performing radio communication with a radio terminal via a relay station, the radio base station including a control unit configured to receive a reception result of data, reported by the relay station, in the event that the relay station receives the data transmitted from the radio base station or from the radio terminal.

Additionally, an embodiment of the present invention provides a relay station in a radio communication system provided with a transmitting station, the relay station, and a receiving station, the relay station including a reporting unit configured to determine whether there is an error in data received from the transmitting station and report, to the receiving station, an error determination result.

Preferably, the reporting unit reports that there is an error in the data by not relaying the data to the receiving station; and the reporting unit reports that there is no error in the data by relaying the data to the receiving station.

Preferably, the reporting unit reports the error determination result with the use of a control signal or a control message.

Preferably, the relay station further includes a storage unit configured to hold the data received from the transmitting station in the event that there is no error in the data; and a transmitting unit configured to resend the data held in the storage unit in the event of receiving, from the receiving station, a resending request to resend the data received from the transmitting station.

Additionally, an embodiment of the present invention provides a receiving station in a radio communication system provided with a transmitting station, a relay station, and the receiving station, the receiving station including a control unit configured to generate a report signal for reporting a resending request to the relay station in the event of receiving, from the relay station, an error determination result indicating that there is no error in data from the transmitting station received by the relay station, and determining that there is an error in the data transferred from the relay station to the receiving station.

Preferably, the receiving station further includes a transmitting unit configured to transmit, to the transmitting station, a reception result indicating that the data is properly received in the event of receiving, from the relay station, the error determination result indicating that there is no error in the data received by the relay station, and to transmit, to the transmitting station, the reception result indicating that the data is not properly received in the event of receiving, from the relay station, the error determination result indicating that there is an error in the data received by the relay station.

Additionally, an embodiment of the present invention provides a relay station in a radio communication system provided with a transmitting station, the relay station, and a receiving station, the relay station including a reporting unit configured to report, to the transmitting station, a reception result of data received from the transmitting station; and a transmitting unit configured to resend the data to the receiving station in the event of receiving a resending report from the transmitting station.

Additionally, an embodiment of the present invention provides a transmitting station in a radio communication system including the transmitting station, a relay station, and a receiving station, the transmitting station including a receiving unit configured to receive, from the relay station, a reception result of data transmitted from the transmitting station and received by the relay station, and to receive, from the receiving station, a reception result of the data received by the receiving station; and a control unit configured to determine whether to resend the data from the relay station to the receiving station or to resend the data from the transmitting station via the relay station to the receiving station, according to the contents received by the receiving station.

Additionally, an embodiment of the present invention provides a relay station in a radio communication system including a transmitting station, the relay station, and a receiving station, the relay station including an error detecting unit configured to detect an error in data received from the transmitting station; a transmitting unit configured to transfer the data to the receiving station in the event that the error detecting unit detects no errors from the data; a receiving unit configured to receive, from the receiving station, a reception result of the data transferred to the receiving station; and a control unit configured to generate a control signal to be sent to the transmitting station according to whether the error detecting unit detects an error and also according to the reception result.

Additionally, an embodiment of the present invention provides a transmitting station in a radio communication system including the transmitting station, a relay station, and a receiving station, the transmitting station including a receiving unit configured to receive a control signal from the relay station; and a reporting unit configured to report a resending request to the relay station to resend data in the event of determining, based on the control signal, that the data need to be resent originating from the relay station.

Additionally, an embodiment of the present invention provides a relay method performed by a relay station provided between a radio base station and a radio terminal for relaying a radio signal, the relay method including the steps of receiving data transmitted from the radio base station or the radio terminal; holding the data; relaying the data to the radio terminal or the radio base station; and resending the data originating from the relay station in the event that the data need to be resent.

Additionally, an embodiment of the present invention provides a relay method performed by a relay station provided between a radio base station and a radio terminal for relaying a radio signal, the relay method including the steps of receiving data transmitted from the radio base station or the radio terminal; and reporting, to the radio base station, a reception result of the data.

The present invention is not limited to the specifically disclosed embodiment, and variations and modifications may be made without departing from the scope of the present invention.

The present application is based on Japanese Priority Patent Application No. 2006-301213, filed on Nov. 7, 2006, the entire contents of which are hereby incorporated by reference.

What is claimed is:

1. A relay station provided between a radio base station and a radio terminal for relaying a radio signal, the relay station comprising:
   a receiver configured to receive data transmitted from the radio base station or the radio terminal;
   a memory configured to hold the data; and
   a transmitter configured to relay the data to the radio terminal or the radio base station, and resend the data based on the data held in the memory, in the event that the data need to be resent,
   wherein when the data is to be resent, the receiver further receives from the base station transmission control data defining a data transmission region in a radio frame from the relay station to the radio terminal or from the relay station to the base station, and the transmitter resends the data to the radio terminal or to the base station based on the transmission control data.

2. A relay station provided between a radio base station and a radio terminal for relaying a radio signal, the relay station comprising:
   a receiver configured to receive data transmitted from the radio base station or the radio terminal and transmission control data from the base station; and
   a processor configured to report, to the radio base station, a reception result of the data for control resending based on the received transmission control data defining a data transmission region in a radio frame from the radio relay station to the radio base station.

3. The relay station according to claim 2, wherein:
   the reporting of the reception result is achieved by not transmitting the received data to the radio base station or by transmitting the reception result as data to the radio base station.

4. The relay station according to claim 2, further comprising:
   a transmitter configured to transmit the data to the radio terminal in the event that the receiver receives the data from the radio base station, and to transmit, to the radio base station, the data received by the receiver from the radio terminal.

5. The relay station according to claim 4, wherein:
   the transmitter transmits, to the radio base station, the reception result of the data received by the relay station together with the reception result received from the radio terminal.

6. A radio base station for performing radio communication with a radio terminal via a relay station, the radio base station comprising:
   a processor configured to create transmission control data defining a data transmission region in a radio frame from the relay station to the radio terminal in the event that the relay station receives data transmitted from the radio base station and the data is to be resent originating from the relay station to the radio terminal and a data transmission region in a radio frame from the relay station to the radio base station in the event that the relay station receives data transmitted from the radio terminal and the data is to be resent originating from the relay station to the base station; and
   a transmitter configured to transmit the transmission control data.

7. The radio base station according to claim 6, wherein:
   a processor is further configured to receive a reception result of data, reported by the relay station, in the event that the relay station receives the data transmitted from the radio base station or from the radio terminal.

8. A relay station in a radio communication system provided with a transmitting station, the relay station, and a receiving station, the relay station comprising:
   a receiver configured to receive data transmitted from the transmitting station; and
   a processor configured to determine whether there is an error in the data received from the transmitting station and report, to the receiving station, an error determination result for control of resending using a data transmission region in a radio frame defined by the receiving station.

9. The relay station according to claim 8, wherein:
   the processor reports the error determination result with the use of a control signal or a control message.

10. The relay station according to claim 8, further comprising:
    a memory configured to hold the data received from the transmitting station in the event that there is no error in the data; and
    a transmitter configured to resend the data held in the memory in the event of receiving, from the receiving station, a resending request to resend the data received from the transmitting station.

11. A relay station in a radio communication system provided with a transmitting station, the relay station, and a receiving station, the relay station comprising:
    a processor configured to determine whether there is an error in data received from the transmitting station and report, to the receiving station, an error determination result for control of resending, wherein:
    the processor reports that there is an error in the data by not relaying the data to the receiving station; and
    the processor reports that there is no error in the data by relaying the data to the receiving station.

12. A receiving station in a radio communication system provided with a transmitting station, a relay station, and the receiving station, the receiving station comprising:
    a processor configured to generate a report signal for reporting a resending request to the relay station using a data transmission region in a radio frame defined by the receiving station in the event of receiving, from the relay station, an error determination result indicating that there is no error in data from the transmitting station received by the relay station, and determining that there is an error in the data transferred from the relay station to the receiving station.

13. A receiving station in a radio communication system provided with a transmitting station, a relay station, and the receiving station, the receiving station comprising:
- a processor configured to generate a report signal for reporting a resending request to the relay station in the event of receiving, from the relay station, an error determination result indicating that there is no error in data from the transmitting station received by the relay station, and determining that there is an error in the data transferred from the relay station to the receiving station;
- a transmitter configured to transmit, to the transmitting station, a reception result indicating that the data is properly received in the event of receiving, from the relay station, the error determination result indicating that there is no error in the data received by the relay station, and
- to transmit, to the transmitting station, the reception result indicating that the data is not properly received in the event of receiving, from the relay station, the error determination result indicating that there is an error in the data received by the relay station.

14. A relay station in a radio communication system provided with a transmitting station, the relay station, and a receiving station, the relay station comprising:
- a processor configured to report, to the transmitting station, a reception result of data received from the transmitting station; and
- a transmitter configured to resend the data to the receiving station using a data transmission region in a radio frame defined by the transmitting station in the event of receiving a resending report from the transmitting station.

15. A transmitting station in a radio communication system comprising the transmitting station, a relay station, and a receiving station, the transmitting station comprising:
- a receiver configured to receive, from the relay station, a reception result of data transmitted from the transmitting station and received by the relay station, and to receive, from the receiving station, a reception result of the data received by the receiving station; and
- a processor configured to determine whether to resend the data originating from the relay station to the receiving station or to resend the data from the transmitting station via the relay station to the receiving station, according to contents received by the receiving station and contents received by the relay station.

16. A relay station in a radio communication system comprising a transmitting station, the relay station, and a receiving station, the relay station comprising:
- a processor configured to detect an error in data received from the transmitting station;
- a transmitter configured to transfer the data to the receiving station in the event that the processor detects no errors from the data; and
- a receiver configured to receive, from the receiving station, a reception result of the data transferred to the receiving station;
- the processor is further configured to generate a control signal to be sent to the transmitting station according to whether the processor detects an error and also according to the reception result.

17. A transmitting station in a radio communication system comprising the transmitting station, a relay station, and a receiving station, the transmitting station comprising:
- a receiver configured to receive a control signal from the relay station, the control signal indicating a reception result at the receiving station and a reception result at the relay station; and
- a processor configured to report a resending request to the relay station to resend data to the receiving station using a transmission region in a radio frame defined by the transmitting station in the event of determining, based on the control signal, that the data need to be resent originating from the relay station.

18. A relay method performed by a relay station provided between a radio base station and a radio terminal for relaying a radio signal, the relay method comprising:
- receiving data transmitted from the radio base station or the radio terminal;
- holding the data;
- relaying the data to the radio terminal or the radio base station; and
- resending the data based on the data held in the holding, in the event that the data need to be resent,
- wherein in the event that the data is to be resent, transmission control data transmitted from the radio base station and defining a data transmission region in a radio frame from the relay station to the radio terminal or from the relay station to the base station is further received in the receiving, and the data is resent to the radio terminal or to the base station based on the transmission control data in the resending.

19. A relay method performed by a relay station provided between a radio base station and a radio terminal for relaying a radio signal, the relay method comprising:
- receiving data transmitted from the radio base station or the radio terminal and transmission control data from the radio base station; and
- reporting, to the radio base station, a reception result of the data for control of resending based on the received transmission control data defining a data transmission region in a radio frame from the radio relay station to the radio base station.

* * * * *